US012244632B2

(12) United States Patent
Jones et al.

(10) Patent No.: US 12,244,632 B2
(45) Date of Patent: *Mar. 4, 2025

(54) SYSTEMS AND METHODS FOR IDENTIFYING AND MAPPING SENSITIVE DATA ON AN ENTERPRISE

(71) Applicant: Kivu Consulting, Inc., San Francisco, CA (US)

(72) Inventors: Elgan David Jones, Washington, DC (US); Thomas Langer, Leesburg, VA (US); Winston Krone, Amsterdam (NL)

(73) Assignee: KIVU CONSULTING, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/241,685

(22) Filed: Sep. 1, 2023

(65) Prior Publication Data
US 2024/0154989 A1 May 9, 2024

Related U.S. Application Data

(63) Continuation of application No. 17/395,713, filed on Aug. 6, 2021, now Pat. No. 11,750,641, which is a
(Continued)

(51) Int. Cl.
H04L 29/06 (2006.01)
G06F 21/57 (2013.01)
(Continued)

(52) U.S. Cl.
CPC ........ H04L 63/1433 (2013.01); G06F 21/577 (2013.01); G06F 21/6218 (2013.01);
(Continued)

(58) Field of Classification Search
CPC ............ H04L 63/1433; H04L 63/1425; G06F 21/577; G06F 21/6245
See application file for complete search history.

(56) References Cited

U.S. PATENT DOCUMENTS

2003/0120952 A1 6/2003 Tarbotton et al.
2006/0085852 A1 4/2006 Sima
(Continued)

FOREIGN PATENT DOCUMENTS

| CA | 2899909 A1 | 7/2014 |
|---|---|---|
| CN | 2899909 Y | 5/2007 |
| EP | 1995929 A2 | 11/2008 |

OTHER PUBLICATIONS

International Preliminary Report on Patentability for International Application No. PCT/US2017/049435, mailed Mar. 5, 2019.
(Continued)

Primary Examiner — Ellen Tran
(74) Attorney, Agent, or Firm — Womble Bond Dickinson (US) LLP

(57) ABSTRACT

Embodiments of the present invention provide techniques, systems, and methods for remote, agent-less enterprise computer threat data collection, malicious threat analysis, and identification and reporting of potential and real threats present on an enterprise computer system. Specifically, embodiments are directed to a system that securely identifies and maps sensitive information from computers across the enterprise. Secure and sensitive information may be internally encrypted and analyzed for indicators of compromise, threatening behavior, and known vulnerabilities. The remote, agent-less collection, analysis, and identification process can be repeated periodically to detect and map additional sensitive information over time, and may delete itself after completion to avoid detection.

20 Claims, 16 Drawing Sheets

Related U.S. Application Data continuation of application No. 16/832,779, filed on Mar. 27, 2020, now Pat. No. 11,089,046, which is a continuation of application No. 15/684,583, filed on Aug. 23, 2017, now Pat. No. 10,609,065.

(60) Provisional application No. 62/381,228, filed on Aug. 30, 2016.

(51) Int. Cl.
| | | |
|---|---|---|
| *G06F 21/62* | (2013.01) | |
| *H04L 9/40* | (2022.01) | |
| *G06F 21/10* | (2013.01) | |
| *G06F 21/16* | (2013.01) | |

(52) U.S. Cl.
CPC ........ *H04L 63/1425* (2013.01); *G06F 21/106* (2023.08); *G06F 21/16* (2013.01); *G06F 2221/034* (2013.01)

(56) References Cited

U.S. PATENT DOCUMENTS

| | | |
|---|---|---|
| 2006/0272024 A1 | 11/2006 | Huang |
| 2008/0313734 A1 | 12/2008 | Rozenberg |
| 2010/0333199 A1 | 12/2010 | Gianoulakis et al. |
| 2013/0219493 A1 | 8/2013 | Banzhof |
| 2014/0201843 A1 | 7/2014 | Hibbert et al. |
| 2015/0326601 A1 | 11/2015 | Grodin |

OTHER PUBLICATIONS

Examination Report Australian Application No. 2017321618, mailed Aug. 1, 2019.
Non-final office action mailed Feb. 5, 2019 in U.S. Appl. No. 15/684,569, filed Aug. 23, 2017.
Examination Report received for Australian Patent Application No. 2023200009, mailed on Jul. 26, 2023, 5 pages.
Examination Report received for Australian Patent Application No. 2017321618, mailed on Aug. 1, 2019, 4 pages.
First Canadian Office Action in App. No. 3,034,647 dated Feb. 20, 2020, 8 pages.
International Preliminary Report on Patentability received for PCT Patent Application No. PCT/US2017/049442, mailed on Mar. 14, 2019, 9 pages.
International Search Report and Written Opinion received for PCT Patent Application No. PCT/US2017/049435, mailed on Nov. 2, 2017, 10 pages.
International Search Report and Written Opinion received for PCT Patent Application No. PCT/US2017/049442, mailed on Oct. 26, 2017, 10 pages.
Lobo, D. et al., "RBACS: Rootkit Behavioral Analysis and Classification System", 2010 Third International Conference on Knowledge Discovery and Data Mining, 2010, pp. 75-80.
Non-Final Office Action received for U.S. Appl. No. 15/684,569, mailed on Feb. 5, 2019, 15 pages.
Non-Final Office Action received for U.S. Appl. No. 15/684,583, mailed on Jun. 3, 2019, 11 pages.
Non-Final Office Action received for U.S. Appl. No. 16/820,395, mailed on Oct. 15, 2020, 10 pages.
Non-Final Office Action received for U.S. Appl. No. 16/832,779, mailed on Dec. 16, 2020, 5 pages.
Non-Final Office Action received for U.S. Appl. No. 17/395,713, mailed on Oct. 6, 2022, 15 pages.
Notice of Allowance received for Australian Patent Application No. 2020213347, mailed on Jul. 20, 2021, 4 pages.
Notice of Allowance received for Australian Patent Application No. 2021225158, mailed on Sep. 26, 2022, 4 pages.
Notice of Allowance received for U.S. Appl. No. 15/684,569, mailed on Nov. 7, 2019, 21 pages.
Notice of Allowance received for U.S. Appl. No. 15/684,583, mailed on Nov. 20, 2019, 5 pages.
Notice of Allowance received for U.S. Appl. No. 16/820,395, mailed on Mar. 8, 2021, 9 pages.
Notice of Allowance received for U.S. Appl. No. 16/820,395, mailed on Nov. 4, 2020, 9 pages.
Notice of Allowance received for U.S. Appl. No. 16/832,779, mailed on Apr. 9, 2021, 5 pages.
Notice of Allowance received for U.S. Appl. No. 16/832,779, mailed on May 26, 2021, 2 pages.
Notice of Allowance received for U.S. Appl. No. 17/395,713, mailed on Apr. 14, 2023, 5 pages.
Office Action received for Canadian Patent Application No. 3034647, mailed on Dec. 16, 2020, 8 pages.
Office Action received for Canadian Patent Application No. 3034647, mailed on Feb. 20, 2020, 8 pages.
Office Action received for European Application No. 17765525.5, mailed on Jan. 23, 2023, 6 pages.
Office Action received for European Application No. 17765525.5, mailed on Mar. 31, 2021, 6 pages.
Rudd, E.M., et al., "A Survey of Stealth Malware Attacks, Mitigation Measures, and Steps Toward Autonomous Open World Solutions", IEEE Communication surveys & Tutorials, Mar. 19, 2016, pp. 1-24.
Second Canadian Office Action in App. No. 3,034,647 dated Dec. 16, 2020, 8 pages.
Wang, Y-M., et al., "Detecting Stealth Software with Strider GhostBuster", 2005 International Conference on Dependable Systems and Networks (DSN'05), 2005, 10 pages.

SYSTEMS AND METHODS FOR IDENTIFYING AND MAPPING SENSITIVE DATA ON AN ENTERPRISE

CROSS-REFERENCE TO RELATED APPLICATIONS

This application claims priority to non-provisional application U.S. patent application Ser. No. 17/395,713, filed on Aug. 6, 2021 and issued as U.S. Pat. No. 11,750,641, which claims priority to non-provisional application U.S. patent application Ser. No. 16/832,779, filed on Mar. 27, 2021 and issued as U.S. Pat. No. 11,089,046, which claims priority to non-provisional application U.S. patent application Ser. No. 15/684,583, filed on Aug. 23, 2017 and issued as U.S. Pat. No. 10,609,065, which claims priority to provisional application U.S. Provisional Application No. 62/381,228, filed Aug. 30, 2016, entitled "SYSTEMS AND METHODS FOR IDENTIFYING AND MAPPING SENSITIVE DATA ON AN ENTERPRISE," which are hereby expressly incorporated herein by reference in their entirety.

BACKGROUND

As information technology is becoming more pervasive throughout enterprises, it is increasingly difficult to protect the hundreds or thousands of computers within an enterprise from malicious threats. Further, it is increasingly difficult to control the storage of sensitive data within the enterprise. Additionally, it is difficult to identify potential vulnerabilities that exist within an enterprise. Moreover, malware and other malicious threats have become more sophisticated and harder to detect before stealing sensitive information or otherwise impacting the operations of an organization. Accordingly, there is a need for tools to identify and monitor malicious threats on the numerous computers within an enterprise.

BRIEF DESCRIPTION OF THE DRAWINGS

Various embodiments in accordance with the present disclosure will be described with reference to the drawings, in which.

DETAILED DESCRIPTION

Figure 1:
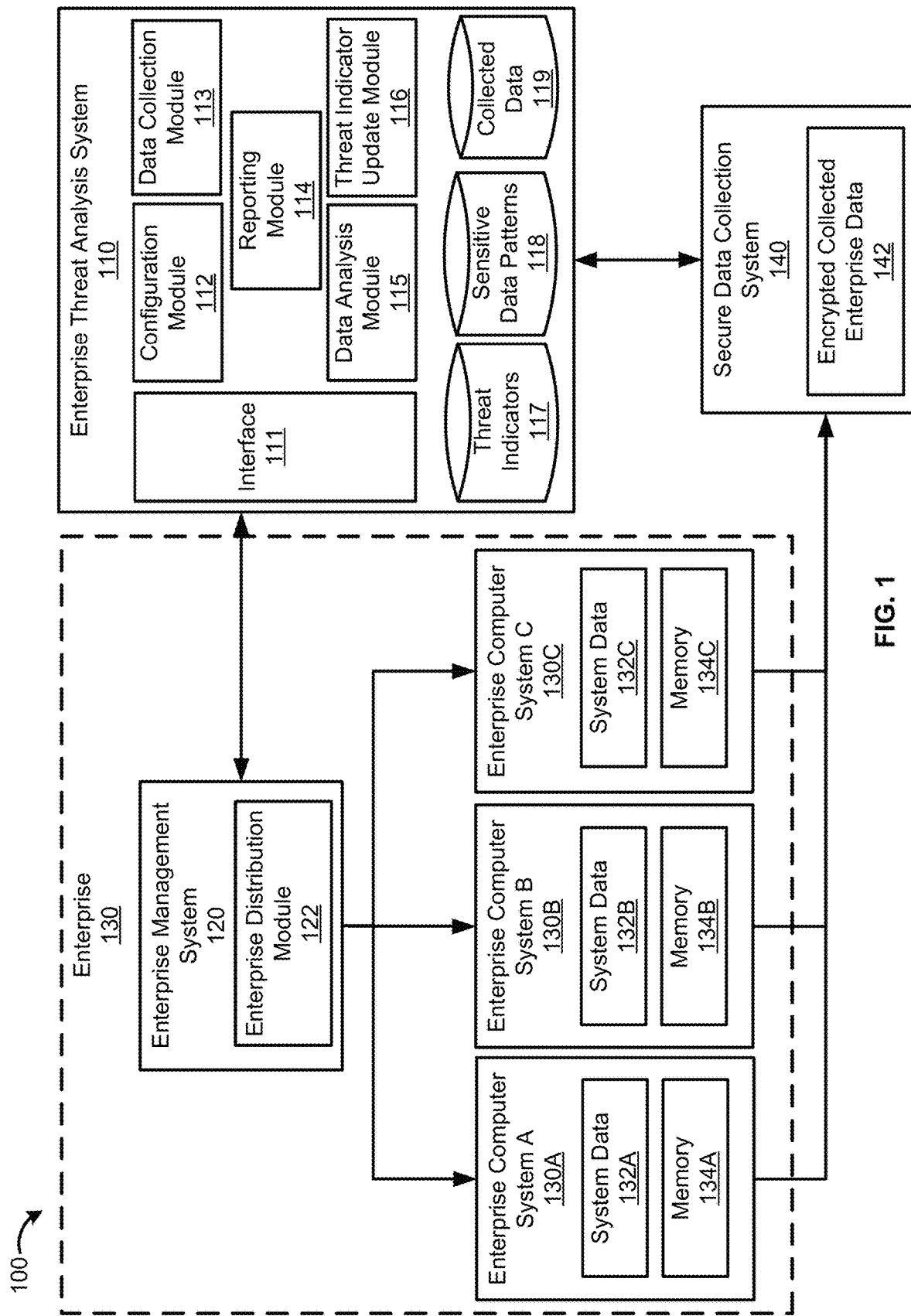
FIG. 1 illustrates a block diagram of an example system for remotely identifying and analyzing threats on enterprise computing systems, in accordance with embodiments of the present invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention provide techniques, including systems and methods, for remote enterprise computer data collection, malicious threat analysis, and identification and reporting of potential and real threats present on an enterprise computer system. For example, enterprises may include thousands or tens of thousands of computing systems. Monitoring each of these systems for malicious threats can be difficult, especially as malicious software (i.e., malware) has become more sophisticated and can be designed to overcome traditional anti-virus software that may be deployed on an enterprise.

Embodiments of the present invention are directed to a remote threat analysis system that is configured to perform remote threat assessment and notification for enterprise-wide computer systems. The threat analysis system may configure a threat analysis software tool that can be deployed across an enterprise. The threat analysis software tool securely collects system information (e.g., logs, network traffic, file names, file paths, configuration settings, etc.) from each of the computers across the enterprise based on threat parameters provided during configuration of the software tool and delivers the collected information to a secure central data storage location across the enterprise. In another embodiment, the system information can be stored locally onto individual computers to provide off-line accessibility. The collected system information may be encrypted internally for added security and automatically transferred from the network to another location for analysis. The threat analysis system obtains the collected information, analyzes the collected information for known threats, indicators of compromise, threatening behavior, and known vulnerabilities, and generates alerts regarding known and potential threats for further analysis and mediation. If potential threats are identified, the threat analysis software tool may include or the system may deploy a memory analysis module that performs a deeper analysis of the potentially compromised/infected computer to obtain more information about the potential threat and returns the volatile state information (e.g., memory data) for additional threat analysis, behavioral analysis, and forensic analysis. The remote collection, analysis, and identification process can be repeated as necessary (e.g., periodically, etc.) to obtain additional information over time in order to identify the nature of a potential threat. The threat analysis software tool may be deployed remotely and all traces of the threat analysis software tool and/or memory analysis module may be removed once the data has been collected from the enterprise computers. Accordingly, the threat analysis software tool and/or memory analysis module may be deployed, executed, and removed before malicious actors may determine that the software is being used to identify malicious software.

Many conventional threat detection systems are limited to or restricted to one operating system. As a result, multiple tools for multiple operating systems must be deployed across different machines (e.g., UNIX servers, Windows work stations), which can be cumbersome, inefficient, difficult to monitor, and inconsistent across different versions of the tool. Conventional Intrusion Detection Systems (IDS) may gather their data from skimming the log collections of Windows systems and/or other logs that are specific to that operating system, which does not enable conventional IDS to be operable on different operating systems. However, embodiments of the present invention address this and other technical problems in conventional systems by further enabling the threat analysis software tool gather system information from each computer and to be operable on different operating systems (e.g., Windows, UNIX, MacOS).

According to various embodiments, the tool has at least three different functional analysis modules that may be combined into a single tool deployed at the same time or individually in sequence to identify and target particular computers that have been identified as having a potential threat. For example, the tool may include an incident-response module that detects dormant or advanced threats (e.g., malware, etc.) across a wide-variety of computers in the enterprise. Some malware can lay dormant for a long period of time, as well as evade defense mechanisms by disabling anti-virus and intrusion defense systems (e.g., intrusion defense systems, firewalls, etc.). The incident-response module may identify these types of malware on a system by collecting system information associated with threat parameters (e.g., network port changes, file names, file paths, configuration settings, etc.) and compare the collected system information over time and between different computers on the enterprise computing network to identify if any threatening behavior or indicators of compromise are present in the collected system information.

The threat analysis system may obtain the collected information from the threat analysis tool and identify malware through the analysis of threat indicators present in the collected system information. For example, the system may perform a signature analysis of files and configuration settings of the system information as well as perform a behavioral analysis to track behavior of the system over time and identify changes in configuration settings and system performance over time. For instance, the incident-response module of the threat analysis tool may be deployed multiple times a day and may perform a behavioral analysis across the multiple scans a day to analyze the changes over the systems between scans. This allows the system to identify malware that is otherwise trying to mask malicious behavior on the system.

Further, the threat analysis tool may include a memory analysis module that obtains memory data (e.g., RAM) and other volatile data (e.g., system logs, etc.) associated with the computer to better identify the particular processes and malicious activity that may be present on the computing system (e.g., analyze the memory to identify embedded malware). Similar threat indicator analysis can be performed on the volatile information to identify malware by comparing memory information over time and/or between computers to identify indicators of compromise.

The threat analysis tool may also include a sensitive data analysis module that is configured to scan enterprise computing systems looking for sensitive data risk. Organizations have very little control of their data and most organizations do not know where their sensitive data resides. For instance, organizations may not be aware if an employee copied sensitive data to their computing system or to a different system. Accordingly, embodiments may identify sensitive data resident on the computers in the enterprise and create a data map or data trail, by data type, dataset, or by category and report full path locations of the identified sensitive data, creating a directory structure of sensitive data within each system. For example, the sensitive data analysis module may identify where sensitive data like personal identifiable information (PII), personal health information (PHI), and payment card information (PCI) are located in the enterprise, which may be unencrypted. In some embodiments, the sensitive data analysis module may determine whether the data is encrypted, password-protected, or in plain text. In cases where the sensitive data analysis module detects that a document is encrypted or password-protected, the sensitive data analysis module may report that the document is protected, but it cannot search or scan the document. The sensitive data analysis module may be configured to identify particular types of sensitive data and may be deployed across the enterprise computer systems. The sensitive data analysis module scans each of the enterprise computers for known sensitive data patterns, collects information associated with identified sensitive data, and delivers the collected sensitive data information to the threat analysis system. For example, the scan can include searching file names for known sensitive data keywords and if any matching files are found, a report including file name, path, creation date, size, etc. may be created and returned to the remote threat analysis system.

The report can be combined with other sensitive data reports received from the other enterprise computing systems into a data map of potential sensitive data contained on the enterprise. According to various embodiments, identification of specific computers containing sensitive data can be compared with an Active Directory of a Windows system (or equivalent in non-Windows systems) to determine which employees, departments, and/or locations are able to access the sensitive data. This determination can be identified by the threat analysis tool stored on specific computers. For example, identifying EU citizen's data that might be accessible to a United States counterpart of a multinational organization, which would be in potential contravention of General Data Protection Regulation (GDPR). Additionally, a sensitive data pattern scan can be performed for all text data stored on the enterprise computer to identify sensitive data that may be hidden within documents. An extensive data map of sensitive data of an organization may be generated. The data map may be used to create a data hotspot, creating a data map so the organization understands where its critical or sensitive data resides. Accordingly, the sensitive data analysis module of the threat analysis system may generate a data map of sensitive data that is present throughout an enterprise system. The data map allows an administrator to implement better data risk policies as well as clean up existing risks from the identified enterprise computing systems.

Additionally, in some embodiments, the tool may be configured to look for vulnerabilities in the computing systems. For example, the threat analysis system may look at software patches and software vulnerabilities to preemptively find and fix vulnerabilities that attackers could use to compromise a system. For instance, the system may identify the version and patches applied to all of the software installed on the various enterprise computing systems and use that information to identify if security patches and/or other updates are necessary on any of the computing systems.

Embodiments provide a variety of advantages over existing anti-virus and other system-based security software. For example, antivirus software uses file signatures to identify a malicious threat. However, anti-virus software only knows what to look for once malicious software has been reported and will not identify malicious behavior if the malicious software is not yet known or widely reported. Typically the process of identifying malware, reverse engineering the malware, reporting the malware to an antivirus service provider, the anti-virus provider creating a signature, and deploying that signature to the client can take at least 24-48 hours from discovery. Accordingly, embodiments provide the tools to identify malicious threats that are not previously known and may quickly and efficiently notify analysts to problems that can be mediated much faster than traditional anti-virus software. Embodiments of the present invention may examine other data created by Advanced Persistent Threat (APT) and/or malware that is separate from the malicious executable file. For example, the threat analysis software tool described herein may detect actions of a hacker (e.g., exfiltration), as the threat analysis software tool cannot be disabled and may operate in a stealth mode such that it is not detectable to a hacker on the system.

Embodiments of the present invention may remotely deploy a tool that proactively looks for the signs of malicious behavior on thousands of computers of an enterprise over time. The tool may collect threat parameters associated with the thousands of computers and analyze the collected information to identify malicious files within a matter of hours. In fact, the anti-virus services may then be notified of the signature of the malicious software as part of the mediation process once a real threat has been identified using embodiments of the present invention. Thus, embodiments run in real-time and can provide a proactive and in-depth forensic analysis of the behavior of computing systems on an enterprise to identify potential malicious activity on the enterprise.

Additionally, embodiments of the present invention may be capable of detecting an previously unidentified threat, alerting an organization's network administrator that network ports are being used by an attacker, thus allowing the organization to take immediate remediate steps to block the threat. As such, embodiments allow an administrator to stop the malicious software from communicating at the firewall level. Thus, by looking at the activity of the computing system at the system information level, embodiments may allow administrators to stop the harmful behavior at the firewall shortly upon identification of the malicious software and may then generate a signature to be distributed to the organization's anti-virus software provider to halt future versions from returning through the anti-virus software.

Moreover, because the collected information is analyzed remotely at the threat analysis system, the identification of a threat and any subsequent shutdown of an enterprise's network would not affect the ability of the threat notification system to identify and remediate the threat. For example, typically when a threat is identified, an enterprise administrator may cut all communications outside of the network to ensure an attack cannot continue and/or that no further sensitive data will be transmitted out of the infected computers. However, embodiments of the present invention may continue to operate even when the network is down because the collected information may continue to be analyzed outside of the enterprise network itself. Further, in some embodiments, the tool itself can continue to run on the enterprise computing systems and continue to collect information and deliver that collected system information to a location within the network to allow further analysis even if the network is down. The tool does not require an agent or other network client other than a location to store collected information. Accordingly, the data can continue to be collected and stored even during an attack.

Further, the tool is agent-less such that the tool does not need to be installed or otherwise require any changes to a local computing system. Instead, the tool is executed remotely and runs on each computing system without requiring specific tailoring to each enterprise network. Further, because the tool is modular, during the configuration of the tool the location, IP range, and any other network-specific configuration information may be added allowing the tool to be tailored to any client environment quickly and easily. The tool can be pushed across the enterprise using push technology of the enterprise management system and may be executed the next time a local user logs onto their system.

By combining the features of temporary remote deployment of software that collects information across a large number of computers to identify potential threats, performing targeted memory collection and analysis of computers associated with those potential threats and performing a deeper forensic analysis and code-level analysis of the identified potential threats, embodiments provide a more efficient, centralized process for identifying potential threats and resolving those threats without requiring on-site analysis. Additionally, by using targeted data collection and analysis of memory only once a potential threat has been identified, embodiments present a number of technical advantages including efficient use of system resources by limiting the resource intensive analysis for those systems identified as having potential threats present.

FIG. 1 illustrates an example system 100 for remotely identifying and analyzing threats and/or sensitive data on enterprise computing systems 130A-C, in accordance with embodiments of the present invention. The system 100 includes an enterprise threat analysis system 110, an enterprise 130 including an enterprise management system 120 and a plurality of enterprise computing systems 130A-C, and a secure data collection system 140. The enterprise management system 120 is configured to interface with the plurality of enterprise computing systems 130A-C.

An enterprise threat analysis system 110 includes one or more computer systems configured to interface with one or more systems of an enterprise in order to configure and deploy an enterprise data collection and analysis tool to the one or more systems of the enterprise. The enterprise data collection and analysis tool is configured to collect information associated with threat parameters and/or sensitive data parameters associated with an enterprise. The enterprise threat analysis system may analyze the collected data for threats and/or sensitive data associated with each of the one or more computing systems within the enterprise system, generate threat reports and/or sensitive data reports, collect additional information from systems with potential malicious threats, and provide information to a system administrator for remediation of the threats and/or improperly stored sensitive data. The enterprise threat analysis system includes an interface 111, a configuration module 112, a data collection module 113, a reporting module 114, a data analysis module 115, and a threat update module 116. The enterprise threat analysis system may include one or more data stores including, for example, a threat indicator database 117, a sensitive data patterns database 118, and a collected data database 119.

Although not shown in FIG. 1, all of the various entities (e.g., computing systems) may communicate through one or more communication networks. The communication networks may include any suitable communications infrastructure and may be implemented using any suitable communications protocol. For example, the communications network may include the Internet, a cellular communications network, WAN network, LAN network, and/or any other suitable network for communicating information between computers in various locations. The computing systems within the enterprise may communicate over an intra-net or private communications network that is secured by one or more firewalls or other security hardware or software.

An interface 111 of the threat analysis system is designed to allow configuration, deployment, and reporting interactions between an enterprise management system and the threat analysis system. For example, a web-based configuration dashboard may be provided through the interface so that a system administrator of the enterprise may configure a threat analysis tool to be deployed on the enterprise. Examples of a configuration dashboard interface are shown in FIGS. 2A-2J that will be described in further detail below. Additionally, configured threat analysis and sensitive data analysis modules may be delivered through the interface and reports or alerts related to potential threats and/or identified sensitive data may be provided through the interface. For example, the enterprise management system may download the tool through the interface once the tool has been compiled and is ready to be executed by the enterprise system.

A configuration module 112 of the threat analysis system is configured to receive threat parameters, sensitive data parameters, and other configuration information. The data analysis tool can be deployed to the enterprise system to collect information on the multiple computer systems of the enterprise. For example, the configuration module may receive threat parameters, sensitive data parameters, and any other configuration information from the configuration dashboard or through an interface with the enterprise management system. For example, a system administrator of the enterprise may select the configuration options through the interface 111 with the enterprise management system. The appropriate module of the tool is selected depending on the required functionality. Additional details regarding the configuration module and configuration dashboard will be described below in reference to FIGS. 2A-2J. Once the configuration options have been determined, the configuration module may compile the enterprise data collection tool into an executable that can be easily delivered and executed on a plurality of enterprise computing systems without being altered or compromised.

A data collection module 113 of the threat analysis system is configured to obtain collected system data and/or sensitive data reports from a secure data collection system. In some embodiments, the data collection module may have one or more encryption keys associated with the enterprise system that may be used to decrypt the collected data that was encrypted by the enterprise before being stored at the secure data collection system. The data collection module may also be enabled to ensure that the system can identify which enterprise computing system is associated with the collected system data and/or to identify previous versions of stored system data associated with each enterprise collection system. For example, specific enterprise computing systems may be assigned unique identifiers and collected data may be time stamped such that the enterprise threat analysis system can track changes between collected system data over time.

A data analysis module 115 of the threat analysis system is configured to process the collected system information to identify known threats or potential threats associated with each of the enterprise computing systems. The data analysis module may perform a number of different types of data analysis based on the type of operation being requested. For example, in some embodiments, the data analysis module may be configured to perform a signature analysis for each of the system data sets collected against a database of known threats, perform a behavioral analysis for each of the system data sets for unknown threats, and/or may perform a vulnerability analysis for each of the system data sets. In some embodiments, the database of known threats may be proprietary to the threat analysis system.

For example, the data analysis module may analyze the collected threat parameters from each of the collected system data sets and compare the collected threat parameters for each system data set to a database of known threat indicators. Threat indicators may include handle indicators, register indicators, network level indicators, and static level indicators. Thus, the data analysis module may identify system data having threat parameters that are matching one or more threat indicators of the database of known threat indicators. The data analysis module may further investigate those computing systems by obtaining memory information associated with that computing system or may generate threat reports including the system data to a system administrator, analyst, or other entity to further investigate and mediate those threats.

The threat parameters may include any system information that may indicate malicious software is operating on the computing system. For example, the threat indicators may include hash signatures of system data, threat conditions associated with the collected threat parameters that indicate malicious software, and/or any other suitable information. For instance, in some embodiments, the data analysis module may be configured to perform a signature analysis by generating a hash of each of the system data sets for the plurality of computing systems within the enterprise and comparing each of the hashed system data signatures to a database of hash signatures of known threats. If there is a match, the data analysis module may identify a computing system containing a threat or a potential threat. The data analysis module may log threat information associated with the computing system including a file identifier associated with the threat, a computing system identifier, a type of threat indicator, and a threat identifier associated with the system data set. The threat information may be included in a threat report and a corresponding threat alert that may be provided to a system administrator computer for the enterprise where a threat is found. In some embodiments, the threat report may be automatically generated by the data analysis module for the system administrator.

Additionally and/or alternatively, in some embodiments, the data analysis module may be configured to compare each system data set of the plurality of system data sets to a previously stored system data set for the computing system associated with the system data set. Accordingly, the data analysis module may identify one or more differences between the previously stored system data set for at least one of the plurality of computing systems. Thus, the data analysis module may identify which threat parameters have changed over one or more previous versions of the system data that have been collected and analyzed previously. The data analysis module may then compare each difference to a database of behavioral threat indicators that indicate that potentially malicious software is present on the computing system.

Accordingly, embodiments may be configured to identify threats that lie dormant for a period of time and/or slowing start to perform malicious activity on a computing system.

Thus, the data analysis module may identify a behavioral threat indicator that matches the difference between versions of the system data to identify a potential threat present on the computing system. The data analysis module may log the relevant information associated with the computing system, system data, and/or behavioral threat and/or may obtain additional memory information from the computing system to perform an in-depth analysis of the processes occurring on the computing system.

Additionally and/or alternatively, the data analysis module may compare the system data set to a reference system data set in order to identify one or more differences between the system data set and the reference system data set. Accordingly, the data analysis module may compare each of the collected system data sets to a reference or template set of system data that each of the systems should have. For instance, where an organization has enterprise computers that are configured to perform a limited number of operations, software, etc., the data analysis module can quickly identify those computing systems that have different capabilities installed and/or the differences over the reference data that is authorized and/or designed to be installed on the computing systems. A similar process to that described above in reference to the comparison of system data over time may be performed where the data analysis module may compare the differences to a set of known threat indicators and log the relevant information for notification purposes or obtain additional memory information from the identified computing systems that may have malicious software or other threats associated therewith.

Additionally and/or alternatively, in some embodiments, the data analysis module may be configured to confirm whether collected data is subject to specific regulatory or legal regimes, such as consumer information or information that could identify specific individuals (e.g., US social security numbers or national identity numbers). The tool could use this information to generate a data map of verified sensitive data. For example, in some embodiments, a tool may be configured to identify sensitive data present on the plurality of enterprise computing systems and may send files and corresponding file information where sensitive data patterns and/or other sensitive data indicators are present on the computing system. Accordingly, the data analysis module may verify the received sensitive data by comparing to a database of sensitive data patterns and may generate a data map associated with the plurality of enterprise computing systems that identifies where an enterprise has sensitive data stored.

A reporting module 114 of the threat analysis system is configured to generate a threat report including relevant information to any identified potential threats identified in the enterprise computing systems and provide the threat report to a system administrator of the enterprise and/or an analyst for further investigation and/or mediation of the threat. Additionally and/or alternatively, the reporting module may generate and deliver an alert to the system administrator to notify them of the potential problem so that the potential threat can be identified and remediated as soon as possible to ensure the least amount of damage or compromise to the enterprise.

A threat indicator update module 116 of the threat analysis system is configured to update the threat indicator database with identified threat indicators where new threat indicators are confirmed as being associated with a real threat. Accordingly, the system may update the definitions of indicators of threats over time which would improve the ability of the system to identify future threats quickly and efficiently. For example, the threat indicator update module may be configured to receive confirmation that at least one of the identified potential threats indicates a real threat, generate a hash of the system data set associated with the real threat, and update the database of known threat indicators to include the hash of the system data set associated with the real threat. Additionally, in some embodiments, the threat indicators may include a rule that identifies the system information settings and/or other threat parameters that indicate the real threat is present. For instance, a port setting, a name of a file, a change in status between two different system configuration settings, and/or any other suitable collected system information may be included in a rule that is stored in the threat indicator database and compared to collected system data to identify future threats.

An enterprise management system 120 includes an administrator computer or other system within an enterprise that has privileges or access to the enterprise computing systems within the enterprise. The enterprise management system may include an administrator portal that may be securely accessed by a designated administrator. The enterprise management system may include an enterprise distribution module that is configured to interface with the enterprise threat analysis system to obtain the configured threat analysis tool, to duplicate the tool, and to deliver the tool to each of the plurality of enterprise computing systems.

The enterprise contains a plurality of enterprise computer systems 130A-C. Each of the enterprise computer systems include system data 132A-C that is associated with one or more configuration settings of an operating system, network communications settings, and/or any other system related information stored on the computing system. For example, the system data 132A-C may include any information related to running processes, running services, network statistics (netstat), DNS cache options, scheduled tasks, completed tasks, firewall settings and processes, persistence information, prefetch information, CHM files, system files, user profile information, temp file information, hidden file information, installed components information, runkey information, alternate data streams information, handles, windows security and event logs, and HBBS information. Further, the types of system information may depend on the type of operating system and other configuration information associated with each computing system. For example, the netstat may include all active TCP and UDP connections, Process IDs, and TCP and UDP ports (expressed numerically) on which the computer is listening. As another example, the running services information may show all currently running services in alphabetical order. As a further example, a process DLL lister may show the full path names of the running process and associated DLL files on the computer. Moreover, as another example, the DLL lister system information may provide a flag for any loaded DLLs that have a different version number than their corresponding on-disk files (which occurs when the file is updated after a program loads the DLL). This would indicate that the DLL is not the original version loaded by the organization. As an additional example, the task list may include a list of all currently running processes and each entry in the task list may include an image/process name, a process identifier, a session name, a session number, memory usage, a status, a user name, a CPU time, and a window title for each process. These are merely examples of the various processes and system information that can be collected by the tool and analyzed by the threat analysis system.

Each of the enterprise computing systems may also include memory data 134A-C associated with the computing system. The memory 134A-C may include any physical device capable of storing information temporarily or permanently on the computing system. For example, Random Access Memory (RAM) is a volatile memory that stores information on an integrated circuit used by the operating system, software, and hardware. In some embodiments, a tool may be configured to obtain a memory dump or core dump of a snapshot of the memory 134A-C at any given time. Accordingly, the memory 134A-C may be accessible by the tool operating on the enterprise computing system and may be used to collect and transmit the volatile system information to a secure data collection system for analysis.

Accordingly, the memory data analysis module may be used to further investigate those computing systems that have indicators of a potential threat being present, and to determine the existence of a genuine threat. Accordingly, the memory data analysis module of the tool may dump the memory 134A-C to a temporary location on the local drive of the computing system (and the tool may identify the space remaining on the machine to identify if there is enough space for dumping the local memory). The memory dump can then be transmitted through secure file transfer protocol (SFTP) to the secure data collection system location on the client enterprise (or outside the enterprise). The threat analysis system may be configured to perform similar threat analysis techniques as described above in reference to the system information to identify real threats within the collected memory information.

The threat indicator database may include a collection of rules, conditions, and/or other information that are known to be associated with threatening behavior. Each entry within the threat indicator database may include multiple different types of threat indicators and logic may be applied to allow for multiple condition dependent rules and settings that may indicate a potential threat. Further, in some embodiments, the threat indicators may include hash signatures of known malware. Accordingly, the threat indicators may be complex multi-conditional rules as well as single condition comparisons of information. The threat indicators conditions may depend on any of the threat parameters that the tool is configured to collect including any of the system information, memory settings, volatile information (e.g., port settings, logs, etc.), and any other information disclosed herein.

The sensitive data patterns database may include stored sensitive data pattern libraries incorporating known data patterns for specific types of data allowing for the identification of individuals (such as US Social Security Numbers and National Identify Numbers).

The collected data may include a collection of collected system information, memory information, and/or sensitive data reports associated with the threat analysis system. For example, the collected data may include the results as well as the raw data associated with previous deployments of the threat analysis tool, memory analysis module, and/or sensitive data analysis module. In some embodiments, there may be different types of collected data, for example different types of threats, different types of sensitive data, and/or different types of signature. The collected data may be organized by client, computing system scanned, and/or by any other suitable manner to ensure the collected data database is useful to analysis of collected information. For example, the collected data may be organized such that all of the previous collected system information is present for a computing system where the threat analysis tool and/or memory analysis module has been deployed. Accordingly, the previously collected system information associated with a computing system can be used to identify changes to the computing system arising between deployments of the threat analysis tool. Any other suitable use of the historically collected system information may also be applied such as obtaining statistics on threats, usage information for deployments and efficacy (e.g., how often the threat analysis tool should be deployed for the best results), and/or for any other data analytics and/or performance analysis purpose. The collected data may be stored in a database or any other suitable data store internal or external to the threat analysis system that is centrally-accessible and secure.

A secure data collection system 140 includes any computer and/or data store that is configured to receive information from the plurality of enterprise computing systems and store the information securely. The secure data collection system may be located within the enterprise or outside of the enterprise. The secure data collection system may be accessible to the enterprise computing systems through any suitable communications protocol and/or through any suitable communications networks. For example, in some embodiments, the secure data collection system may be a server computer that is a part of the enterprise, the threat analysis system, or a third party that may receive information from the enterprise computing systems using secure file transfer protocol (sFTP). The secure data collection system may implement security features including encryption keys and/or log-in credentials to ensure only an authorized threat analysis system and/or forensic specialist can obtain the collected data from the enterprise computing systems.

FIGS. 2A-2J illustrate exemplary configuration interfaces for configuring a tool for remotely identifying and analyzing threats on an enterprise system, in accordance with embodiments of the present invention. Embodiments of the present invention provide a configuration and compiling dashboard that allows the software to quickly and easily be altered and customized for the threat parameters and/or sensitive data that is specific to an enterprise.

Figure 2A:
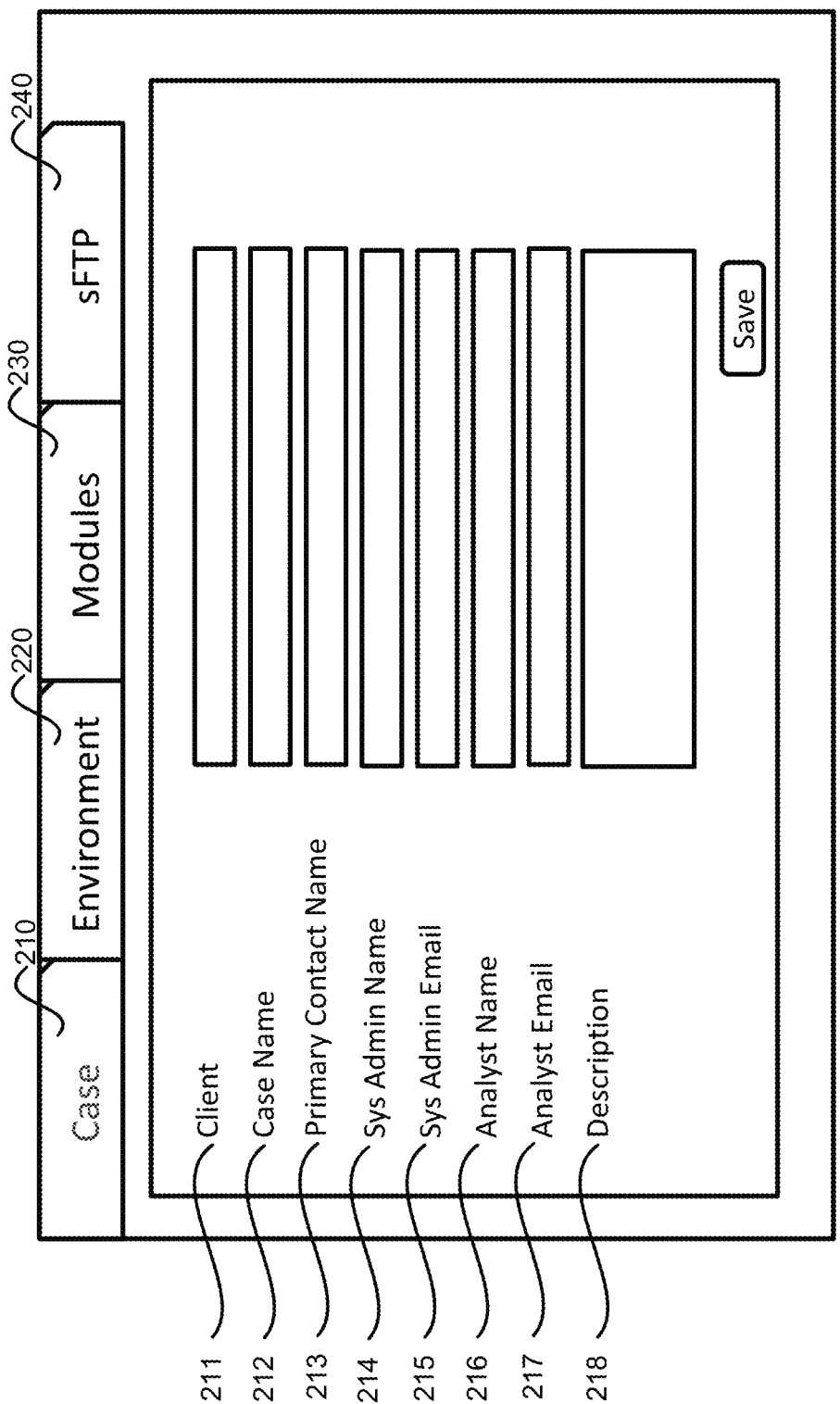
FIGS. 2A-2J illustrate exemplary interfaces for configuring a tool for remotely identifying and analyzing threats on an enterprise system, in accordance with embodiments of the present invention.

FIG. 2A shows an example graphical user interface for an initial case configuration interface of the configuration dashboard. The configuration dashboard includes a variety of different functional modules that a system administrator and/or analyst may use to configure a threat analysis tool that is tailored for an enterprise. For example, the configuration dashboard may include a case interface 210, an environment interface 220, a data analysis modules interface 230, and a data transfer interface (e.g., sFTP interface 240). FIG. 2A shows the configuration information that may be provided through the case interface. The case interface may be the first interface shown when configuring a threat analysis tool for an enterprise. The case interface allows an analyst to identify the client 211, case name 212, primary contact information 213, system administrator information (e.g., name 214 and email 215), analyst information (e.g., name 216 and email 217), and a description 218 of the case to allow analysts in the future to quickly and easily identify the purpose for the threat analysis tool and any other details surrounding the tool being generated.

Figure 2B:
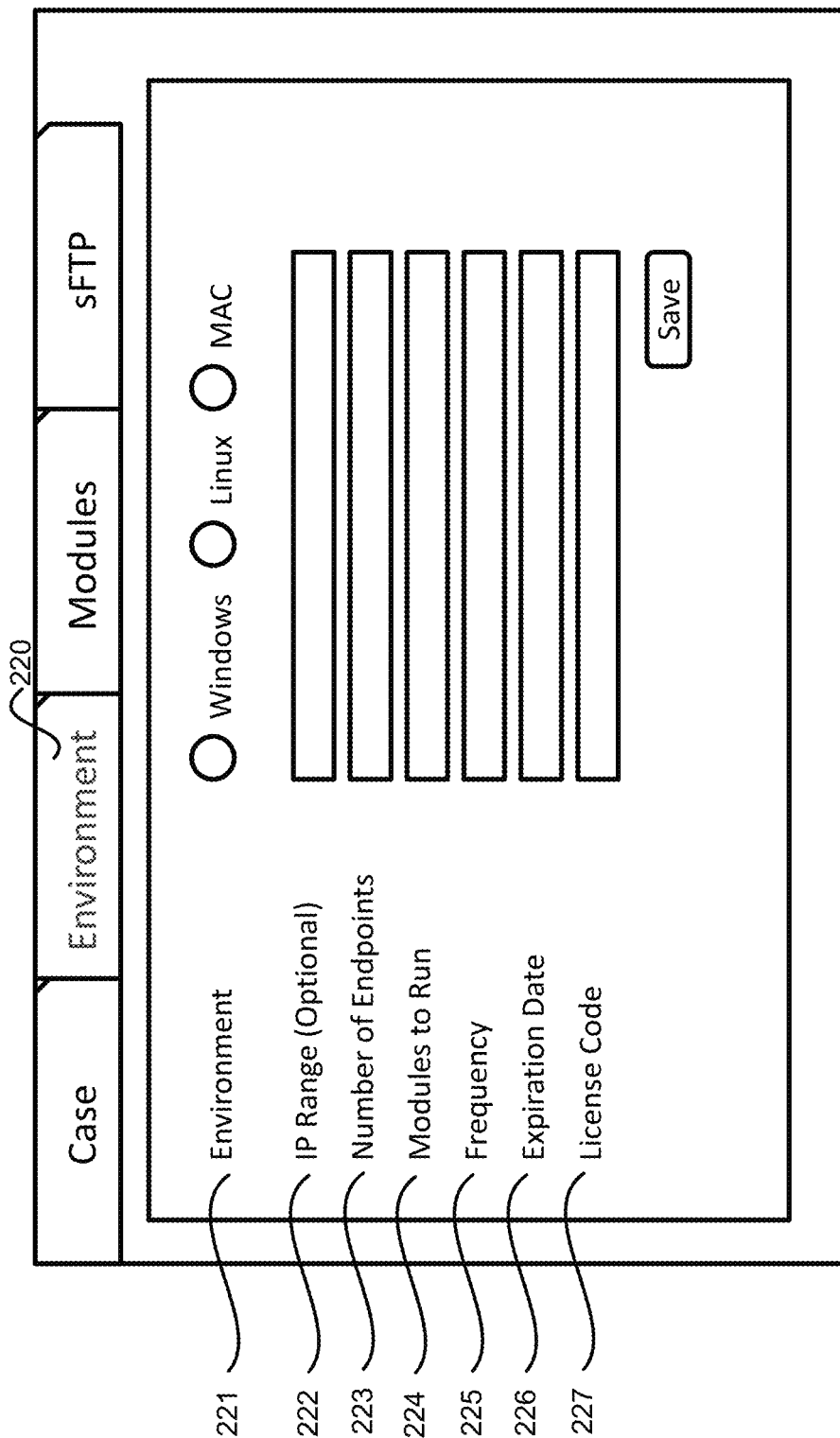

FIG. 2B shows an example graphical user interface for the environment interface associated with the threat analysis tool. The environment interface allows an analyst or system administrator to tailor the threat analysis tool to the particular enterprise computing systems. For example, the environment interface allows the analyst or system administrator to select the operating system environment(s) 221 (e.g., Windows™, Linux™, Mac™) that are running on the enterprise computing systems to be analyzed. According to some embodiments, the enterprise computing systems may include a variety of different operating system environments, which may be selected via the environment interface in setting the parameters for the threat analysis tool specific to the enterprise computing systems to be analyzed. Additionally, the analyst may select the IP range of the enterprise computing systems that the tool may be deployed to, the specific number of endpoints on the enterprise computing systems to be analyzed by the tool, the different modules that the tool may be configured to operate, the frequency that the tool should be deployed on the enterprise computing environment, the expiration date of the tool, and a license code for the tool. Accordingly, the threat analysis tool may be configured to be periodically distributed to the enterprise computing systems to periodically collect and analyze potential threats on the enterprise computing systems.

Figure 2C:
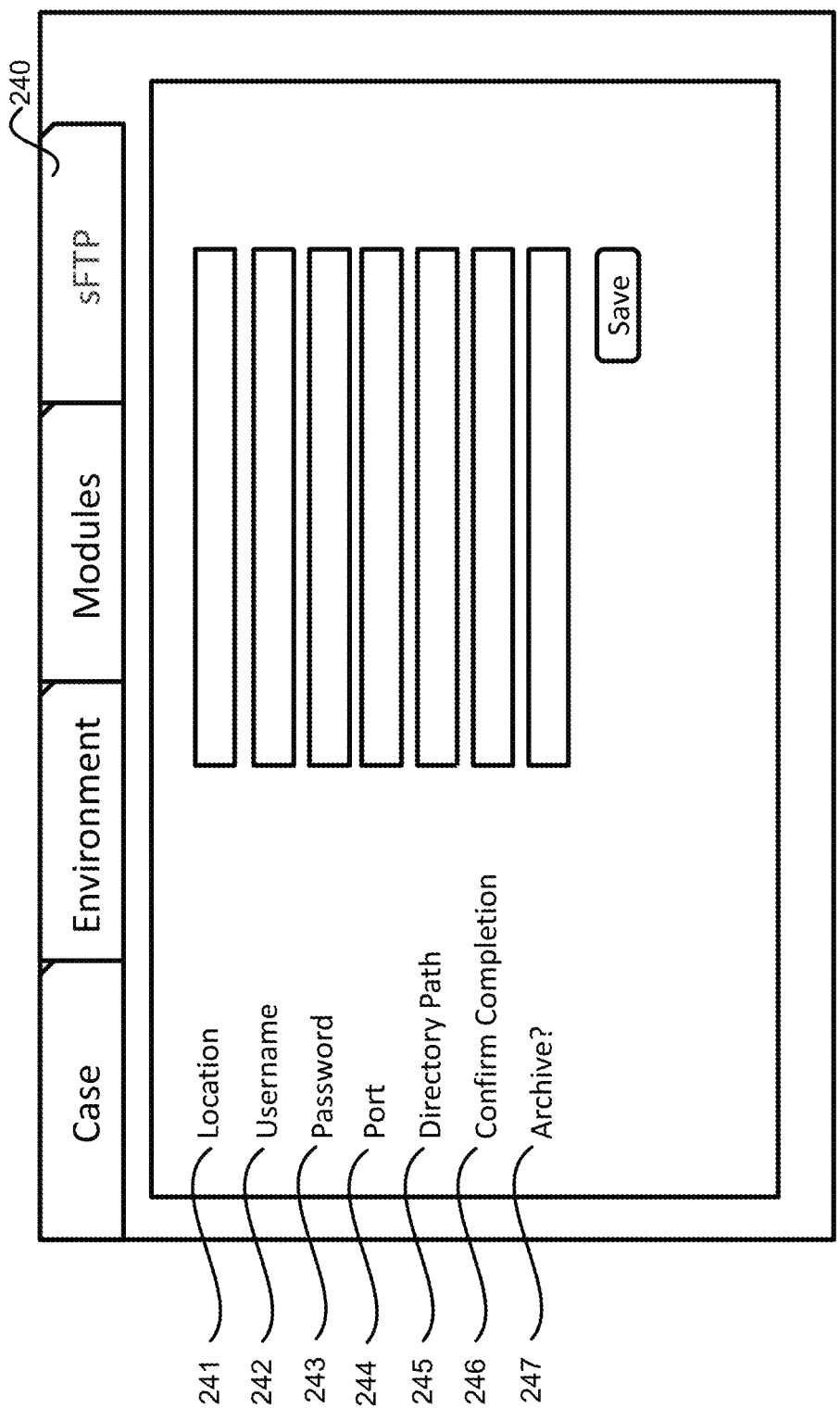

FIG. 2C shows an example graphical user interface for a data transfer interface (e.g., sFTP interface 240) associated with the threat analysis tool. The data transfer interface allows an analyst to identify a secure area where the collected system information obtained by the threat analysis tool can be securely delivered. For example, the data transfer interface 240 may include a location field 241, a username field 242, a password field 243, a port field 244, a directory path field 245, a completion field 246, and an archive field 247. The location field 241 allows an analyst to indicate a network address or data store address for storing the system information that is collected by the threat analysis tool. The username field 242 and password field 243 may be used to establish credentials to be used with the data store to allow access to the collected system information and/or to authenticate the computer gaining access to the secure data store for secure delivery and storage of the collected system information. The port field 244 may be used to indicate a network port that can be used as a communication endpoint for delivering and/or accessing the secure data store. The directory path field 245 may be used to identify a unique location in a file system of the data store to identify the specific computer in which the tool is being executed so that the collected system information can be tied to the particular computing system or endpoint. For example, the directory path may point to a file system location for the collected system information on the secure data store by following the directory tree hierarchy expressed in a string of characters in which path components, separated by a delimiting character, represent each directory. The completion field 246 may indicate an address to which a message can be sent by the threat analysis tool operating on each computing system. The message may indicate that the particular computing system has successfully completed the operation of the tool. The archive field 247 may indicate an option that is provided to the secure data storage location to indicate whether the collected system information should be archived on the secure data storage location and/or on the computing system that operated the threat analysis tool. Accordingly, an analyst may use the data transfer interface 240 to input options for how the tool interacts with the secure data storage location and/or the threat analysis system when the tool is being executed on an enterprise computing system.

Figure 2D:
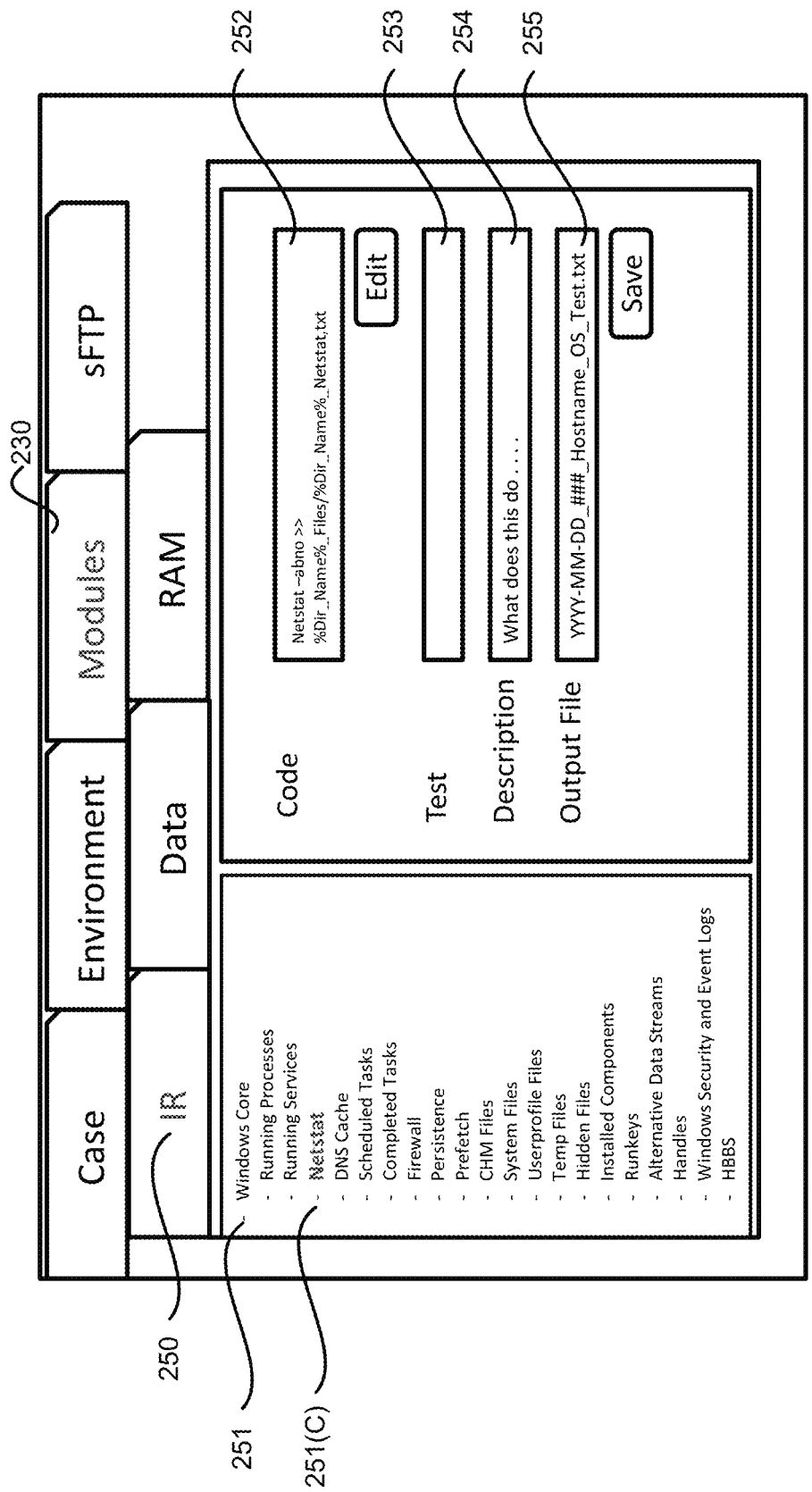

FIG. 2D shows an example graphical user interface for the data analysis modules interface 230 associated with the threat analysis tool. The data analysis modules interface 230 allows an analyst to customize the type of data analysis and the types of threat parameters that may be collected from a computing system when the threat analysis tool is executed on the enterprise computing device. The data analysis modules interface may include three different data analysis modules, each of which is configured to collect different types of system information associated with different threat parameters. For example, the data analysis modules may include an incident-response module 250, a sensitive data analysis module 260, and a memory analysis module 280.

The incident-response module 250 allows an analyst to select threat parameters that the threat analysis tool may collect from targeted computing systems and the threat analysis system may use to identify threats on a wide variety of computing systems. The incident-response module may allow the threat analysis system to collect system information from a large number of computing systems simultaneously and may use the collected system information to detect known threats and/or dormant/advanced threats. For example, the threat analysis tool may use signature analysis to generate hash signatures of known threat indicators, generate a hash signature of the collected system information (e.g., a hash of each file that is stored on the computing system), and compare the hash signatures of the system information (e.g., each file hash signature) to detect known threats from the collected system information (e.g., if the hashes match, the system flags that file). Additionally, the threat analysis tool may identify advanced or dormant threats by comparing changes between collected system information over time. For example, advanced malware may be designed to evade defense mechanisms like antivirus software by remaining dormant for a significant period before rebooting and causing damage. During this dormant period, the malware will provide no characteristic behavior that will identify it as harmful.

The sensitive data analysis module 260 allows an analyst to select sensitive data parameters that a sensitive data analysis module may use to identify and collect sensitive data on the enterprise computing systems. The sensitive data analysis module may be configured and distributed to an enterprise to scan the enterprise computing systems for files containing sensitive data. The sensitive data analysis module may be distributed by the threat analysis system, or in some embodiments, by a separate sensitive data analysis system. The sensitive data analysis module scans each computing system that it is deployed on for file names and content that matches the configured sensitive data parameters. Thus, the sensitive data analysis module may scan a computing system for sensitive information. For example, data on storage media of the computing system is searched for the presence of PII and PHI information by scanning for pre-defined patterns. The patterns are maintained in pre-defined libraries or set up during configuration of the scan tool. The pre-defined libraries may be periodically updated and notifications may be sent to a license holder of the libraries. The sensitive data analysis module may scan external media (e.g., a USB storage device) connected to a computing system as well as the primary computing system. The sensitive data analysis module may be configured to parse the files present on the computing device in order to read files for the presence of PII and PHI. The tool may read different text encoding formats used in Windows environments (as well as other operating system environments) so that all common user file types may be analyzed. Further, the tool is configured to function in read-only format so that the tool does not modify or change file content or metadata, thus allowing for subsequent forensic analysis of specifically identified files to determine whether specifically identified files have been recently opened/accessed.

The sensitive data analysis module may be configured to scan the file names and file content for configured data patterns. For example, an analyst may enter data patterns into the configuration dashboard that the tool will use to search the computers within the enterprise for the provided data patterns. The data patterns can be organized as libraries or can be customized for a particular system, network, or search. For example, the data patterns may include libraries of data patterns that are organized by country (e.g., U.S. data patterns, E.U. data patterns, etc.). Further, the data patterns can be organized by industry and/or sensitive data type. For instance, a data pattern library may include PHI data patterns, PCI data patterns, PII data patterns, etc. In some embodiments, the data patterns may be provided through scripts (e.g., regular expressions (regexs)) that are configured to identify data patterns in parsed text. For example, the regex may be configured to look for numbers and alphanumeric characters in a particular format (e.g., data pattern of U.S. Social Security numbers being xxx-xx-xxxx) and search an entire file for all instances of the pattern regardless of the size of the file. If the tool identifies one of the sensitive data patterns as being present in the file, the tool may flag the file, collect information associated with the type of file, location of the file on the computer system, type of sensitive data matched, etc., and log that information for delivery to the threat analysis system. Once all relevant files have been analyzed, one or more sensitive data reports can be transmitted to a database for analysis by the threat analysis system.

Further, in some embodiments, the sensitive data analysis module can collect the file and send the file to the data collection system as well. In some embodiments, the tool may assign a unique identifier to each file so that the file can be tracked in the future and/or consolidated into a more secure storage location across multiple systems. For example, a hash may be applied to the file to identify a unique identifier for the file, the file may be stored in a secure location that is accessible to the system, and the system may request the file using the unique identifier any time that file is requested by a user or a service of the computing system.

The sensitive data parameters may include file names, file extensions, search terms, keywords, data patterns, regular expression (regex) libraries, types of sensitive data to analyze, file extension families, etc. which the tool may use to identify sensitive data present on a computing device. For example, the configuration module may be used to configure a sensitive data analysis module (which may be combined with the other modules described herein) to scan each computing system of an enterprise looking for data risk present on each computing system. For example, the sensitive data analysis module may scan for PII data on the system by searching for plain text documents on each computing system that match the data patterns, keywords, and/or other indicators of sensitive data on the system. As such, the tool may look for data patterns and target any unencrypted PII, PHI data, or PCI data, or any other sensitive data that resides in a computing system.

The sensitive data analysis module may log the file names, type of sensitive information, the location of the sensitive information, and/or any other relevant information related to the sensitive data and may transmit that information to a secure data storage node for further verification and analysis. The threat analysis computer may use the logged sensitive data to generate a data map of the sensitive data that is present on the enterprise across the various computing systems within the enterprise. For example, the data map may include the document identifiers that contain the sensitive data, the computing system that contains the sensitive data and the file directory or other location identifier of where it exists. Accordingly, embodiments may be used to allow enterprise wide scans and generation of enterprise wide data maps of any unencrypted PII, PCI, or PHI data. Enterprise operators can use this data map to identify where potential threats exist within the system and where sensitive data is stored on their enterprise so that they can increase the security of those systems identified by the tool as storing sensitive data. Accordingly, the sensitive data analysis module can scan the enterprise and look for unencrypted sensitive data, whether the data is within a spreadsheet, word document, PDF files, and/or any other files that contain unencrypted sensitive data.

A memory analysis module 280 analyzes collected memory information that is obtained from enterprise computing systems. The memory analysis module may be configured, packaged, and deployed on targeted computing systems within the enterprise. The memory may be parsed into text files and collected manually or may be transmitted via secure file transfer protocol to a secure storage location. The collected memory information from the computing system may be analyzed by the memory analysis module for malicious indicators.

The memory analysis module may target volatile memory data on each computing system and may analyze the embedded processes running in the memory for signs of threats. So-called "Volatile Memory" is required for the successful running of processes in computer systems. Accordingly, the memory analysis module is able to collect targeted volatile memory data (and related system logs, event logs, etc.) to carry out an analysis of the volatile information in order to identify potential threats that are executed and run in volatile memory, or otherwise leave temporary artifacts in volatile memory. Accordingly, some embodiments are configured to run the threat analysis tool, find a potential threat where the specific threat is unknown, deploy the memory analysis module to target the volatile data including the memory data, system logs, event logs, and complete an analysis on the volatile information to better identify whether a real threat exists. Accordingly, a similar analysis as that provided by the system information threat analysis tool may be performed on the volatile memory to identify threats to the enterprise.

FIG. 2D shows a variety of threat parameters that may be identified for a computing system based on the type of operating system and/or other computing system dependent information. For example, as shown in FIG. 2D, the threat parameters may include different types of indicators that may be collected by the threat analysis tool. The incident-response module interface may allow an analyst to select options for collecting the different types of threat parameters for the threat analysis tool. For instance, for the Windows operating system incident-response module interface configuration shown in FIG. 2D, the different types of threat parameter options may include running processes 261(*a*), running services 261(*b*), network statistics (netstat) options 261(*c*), DNS cache options 261(*d*), scheduled tasks options 261(*e*), completed tasks options 261(*f*), firewall options 261(*g*), persistence options 261(*h*), prefetch options 261(*i*), CHM files options 261(*k*), system files options 261(*l*), user profile options 261(*m*), temp file options 261(*n*), hidden files options 261(*o*), installed components options 261(*p*), runkeys options 261(*q*), alternate data streams options 261(*r*), handles options 261(*s*), windows security and event logs options 261(*t*), and HBBS options 261(*u*). Each of these threat parameter options may have a different interface providing different options that an analyst may select to customize the type of information that may be collected and utilized by the threat analysis tool.

For example, FIG. 2D shows an example graphical user interface for the network statistics threat parameter options interface 251(c) associated with the threat analysis tool. This graphical interface may be operable on Unix-like operating systems including OS X, Linux, Solaris, and BSD, and is operable on Windows NT-based operating systems or other suitable Windows operating system. A threat parameter options interface 251 allows an analyst to select the options and/or otherwise configure the threat analysis tool to collect the threat parameters associated with the system information on the computing systems of the enterprise. For instance, the interface includes a code field 252, an edit input element 253 for editing the code field 252, a test field 254, a description field 255, an output file naming field 256, and a save input element 257. The code field 252 allows an analyst to input and edit software code that guides the threat analysis tool's collection of system information associated with the information stored on a computing device. The edit input element allows the analyst to easily edit the code in this field to target different data and/or alter the functionality of the threat parameters. The test field may be used to test the code that was entered by uploading a test file and reviewing the potential output. The description field allows the analyst to input a description into the collected system information file that is generated by the threat analysis tool and/or to help an analyst identify the purpose of the software code that is in the code field. The output file field allows the analyst to enter a file name that uniquely identifies the specific computing system on which the threat analysis tool is being operated. This allows the threat analysis system to identify the source of a potential threat based on the threat parameters collected from the computing system.

Additionally, the threat analysis module may be configured to identify system vulnerabilities based on the collected system information. For example, the tool may collect system information from the various enterprise computing systems and may analyze that system information looking for vulnerabilities in the computing systems. For example, computing systems may receive security patches or other updates every week and the tool can look for system vulnerabilities and software vulnerabilities before they are exploited. Accordingly, the data analysis module may look for weaknesses in the computing systems that attackers could use or target to make the system vulnerable to malware. Accordingly, the threat analysis module may compare configuration information and software version information to identify the version and status of software and/or plugins installed on the computing systems. Accordingly, the threat analysis system may identify weaknesses in systems that could include either hardware weakness or software weakness. For example, if an enterprise does not keep its software patches up-to-date, attackers may find vulnerabilities in the system and the threat analysis module may identify these vulnerabilities and install the appropriate patches to ensure the system is up-to-date and to plug known vulnerabilities.

Figure 2E:
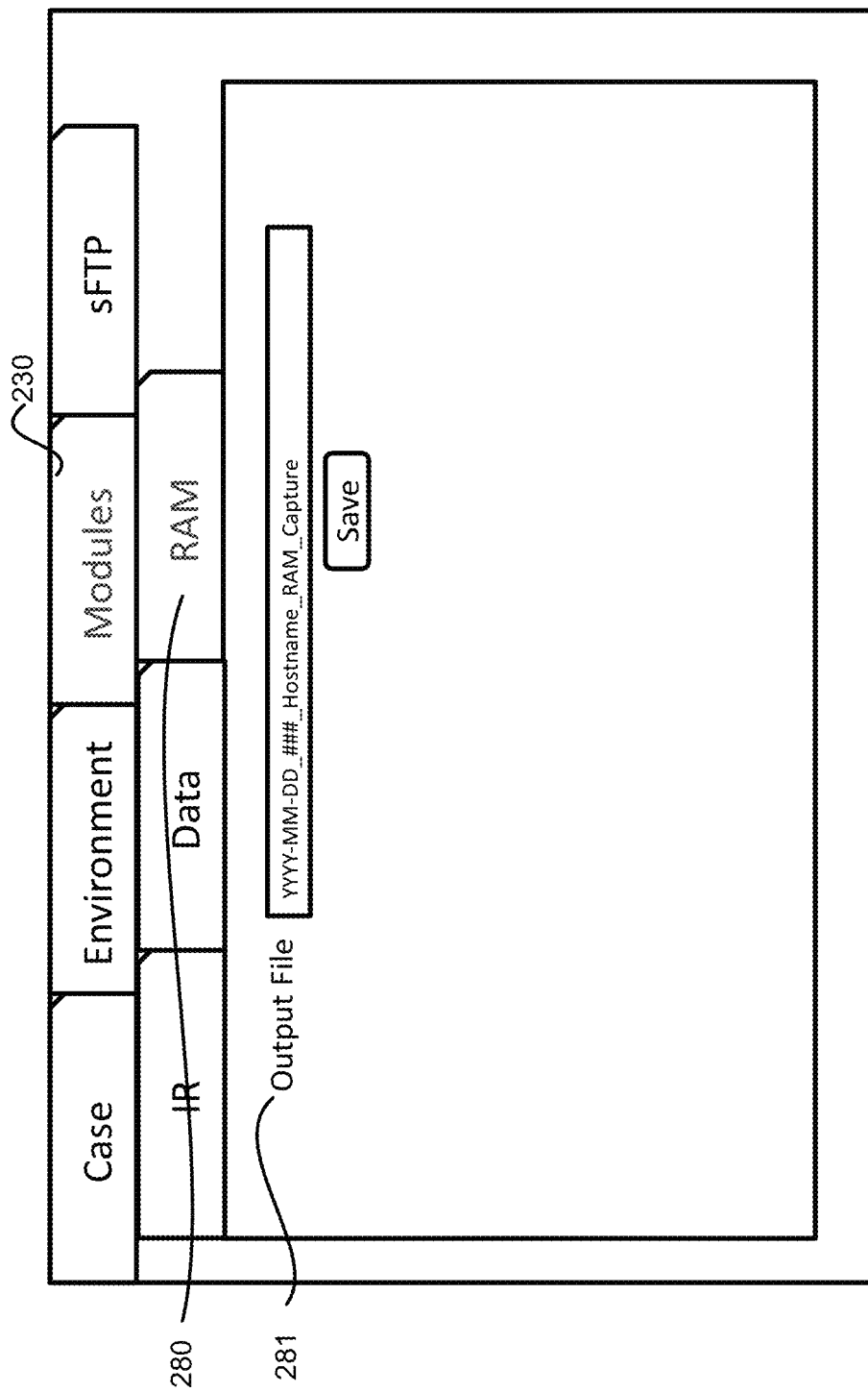

FIG. 2E shows an example graphical user interface for the memory threat analysis module interface 280 associated with the memory analysis module. The memory data analysis module interface 280 allows a user to configure the memory analysis module to obtain volatile memory data from the computing system where the tool is deployed. The memory information may be obtained and outputted to the secure storage location in a file having the naming convention provided in the output file field 281 shown in FIG. 2E. The user may select to obtain this information when a potential threat has been identified on a particular computing device.

Figure 2F:
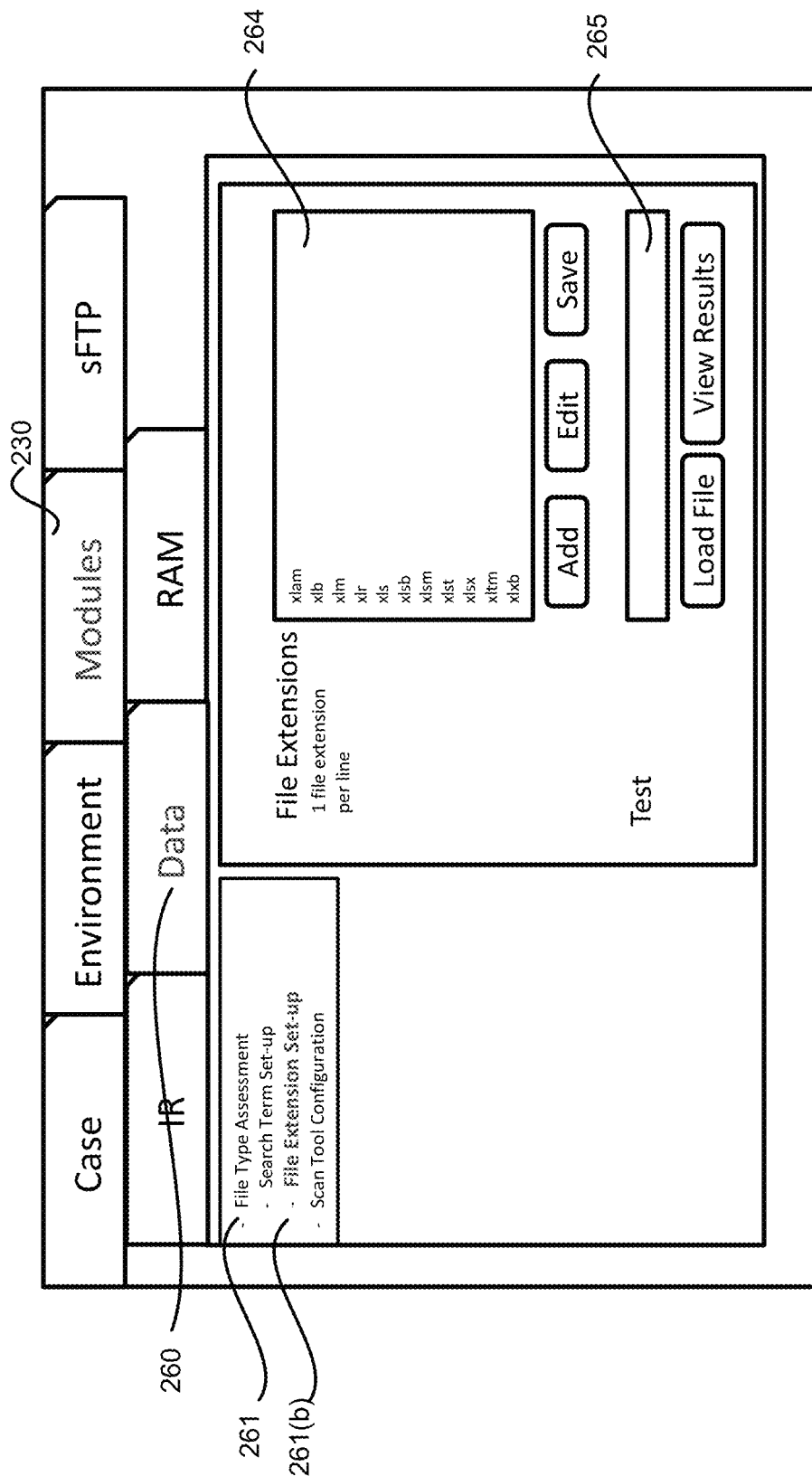

FIG. 2F shows an example graphical user interface for the sensitive data analysis module interface 260 associated with the sensitive data analysis module. The sensitive data analysis module interface 260 allows an analyst to identify types of sensitive data that the sensitive data analysis module is configured to identify and log. For example, the sensitive data analysis module may be configured to perform a file type assessment 261 including a search term set-up 261(a) and a file extension set-up 261(b). Additionally and/or alternatively, the sensitive data analysis module may be configured to perform a scan tool that includes scan tool configuration options. The analyst may use the sensitive data analysis module interface 260 to determine which types of sensitive data the module will search and/or identify, and how the sensitive data analysis module may search a system. For example, different data patterns, file names, file extensions, keywords, and/or any other relevant information may be entered into the interface to find potential sensitive data on an enterprise computing system in which the tool is deployed. For example, sensitive data patterns may be identified through the use of regular expressions and search terms such as "social security number" or "SSN". When a pattern is detected within a file on the computing system, a sample of content surrounding the detected pattern in the file is extracted for analysis.

For example, FIG. 2F shows an example graphical user interface for the file extension set-up configuration options 261(b) including a file extensions field 264 and a test field 265. An analyst may enter the types of file extensions that the sensitive data analysis module may use to search a computing system for matching files. These file extensions may be added, edited, and/or saved through the interface. The analyst may also test the tool through the test field 265 which allows for the analyst to test different files and/or configurations to identify whether the module is working correctly and/or to alter the configuration settings.

Accordingly, the sensitive data analysis module is configured to scan the enterprise looking for criteria within searchable files. The module will have the capability to read files and search for keywords using Boolean searches, or carry out searches using Regular Expressions. The sensitive data analysis module searches computers individually and, for each computer, a sensitive data report may be generated that includes a file name, file path, file creation date, file last written date, file size, keywords that matched the file, and an indication of no matching records (i.e., where there are no files with file names matching those search terms). Further, in some embodiments, the tool may tag identified files with a unique identifier, may copy the identified files to a secure repository, and may delete the identified files for the purpose of document archiving and sensitive data containment.

A sensitive data pattern may be defined using a Regular Expression ("regex"). Each regex may have an associated label that uniquely identifies the sensitive data pattern that the regex is configured to identify. Each regex may also be assigned to an associated category, such as PII, PHI, and PCI. When a sensitive data pattern is identified within a document, the title and category of regex may be identified and logged in a sensitive data report. Each pattern may be identified as being not present or present, and, if present, the number of times it is present in a file or in a search location. Sensitive data patterns may be entered individually (e.g. a specific regex for a unique item of PII, such as a U.S. Social Security Number as XXX-XX-XXXX), or defined by the selection of a specific category (e.g. "Credit Cards" containing the regex for all variations of credit card numbers issued by US or international financial institutions). A regex may include a combination of one or more regular expressions or a combination of regular expressions and keywords. The regex may contain boundaries and/or Boolean logic such as "or" and "and."

The file type assessment options 261 allow an analyst to configure the tool to identify particular file types that may contain sensitive data. For example, file types may correlate to the presence of PII and PHI—particularly, user file types such as Adobe Acrobat or Microsoft Office documents. For example, the file type assessment may include the options for collecting file names and respective file metadata where the file name contains one or more key words that are in a pre-defined keyword list. File names and metadata can be read from the NTFS Master File Table (MFT) of the computing system.

The search term set-up options may allow a user to determine which search terms the file type assessment functionality use in searching a specific computing device. The search terms are managed as a library or defined by a scan tool user where a set of related search terms may be organized into a category of search terms. The search terms may also be organized into a search term library that may contain one or more categories of search terms.

Figure 2G:
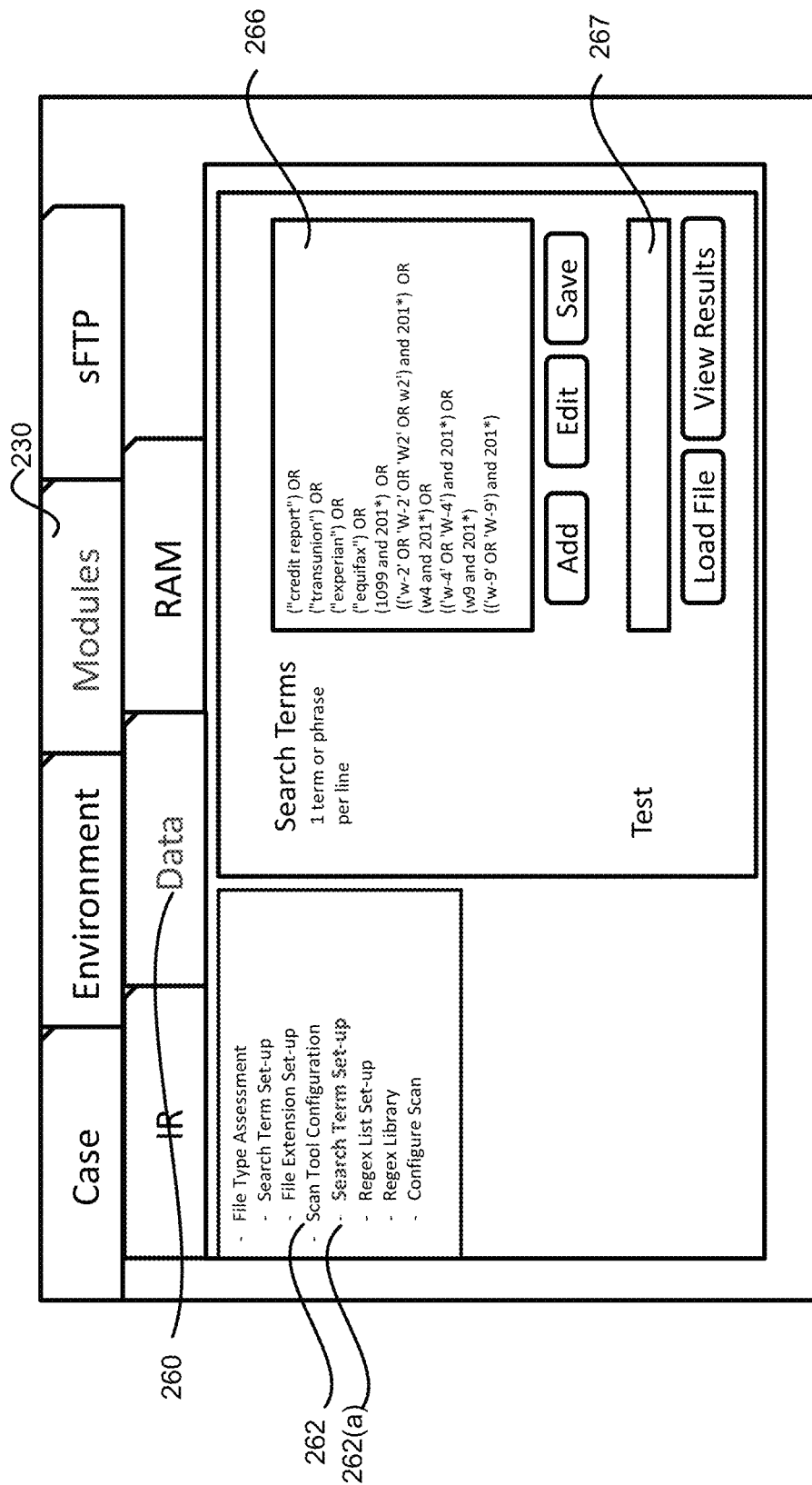

FIG. 2G shows an example graphical user interface for the sensitive data analysis module interface 260 associated with the sensitive data analysis module. Specifically, FIG. 2G shows the scan tool configuration 262 options including the search term set-up 262(a), regex list set-up 262(b), regex library 262(c), and configure scan options 262(d). FIG. 2G shows the search term set-up 262(a) options that are available for configuration. The search term set-up 262(a) options interface allows an analyst to select the search terms to scan the files on the computing system in order to identify sensitive data that may be present within files on the system. For example, the search terms window 266 allows the analyst to select or enter keywords to be used to search files. The analyst may also test the tool through the test field 267 which allows for the analyst to test different files and/or configurations to identify whether the module is working correctly and/or to alter the configuration settings.

Figure 2H:
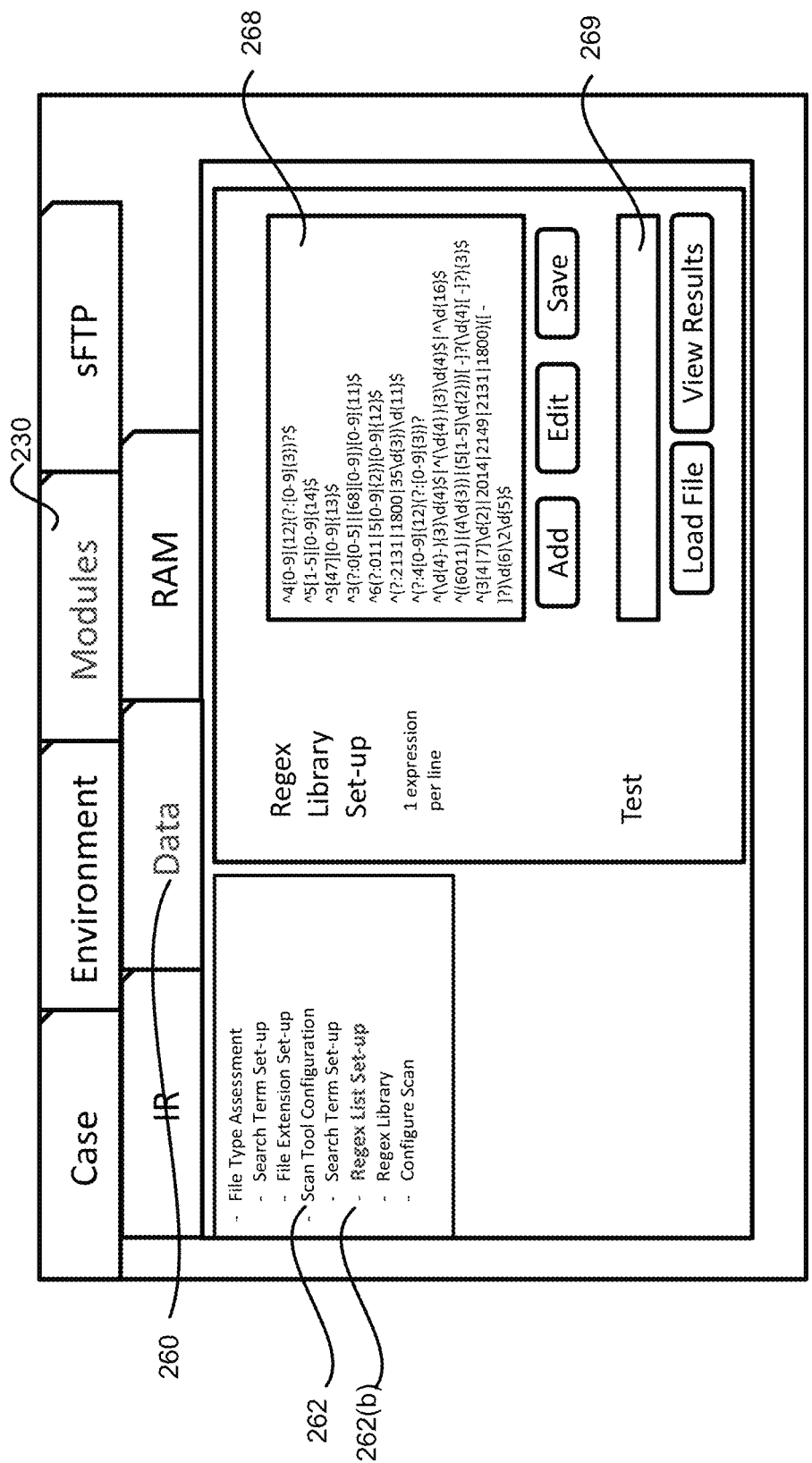

FIG. 2H shows an example graphical user interface for the sensitive data analysis module interface 260 associated with the sensitive data analysis module. FIG. 2H shows the regex list set-up 262(b) options that are available for configuration of the sensitive data analysis module. The regex list set-up 262(b) options interface allows an analyst to configure the sensitive data patterns that are listed in a category or library. Further, the regex library window allows the analyst to select or enter sensitive data patterns that would be included in a particular regex library or category. Each of the lines within the regex library window includes a separate sensitive data pattern that can be searched against a file by the sensitive data analysis module. Custom sensitive data patterns may be provided through the regex library window by entering a list of regular expression patterns, each pattern having a specific label. For example, custom data sources such as international classification of disease (ICD) codes that identify a medical diagnosis may be incorporated into the data scanning and extraction process. Further, in some embodiments, new sensitive data patterns can be uploaded into the tool as they are developed. The analyst may also test the regex library through the test field 269 which allows for the analyst to test different files and/or configurations to identify whether the regex library is working correctly and/or to alter the configuration settings of the regex library.

Figure 2I:
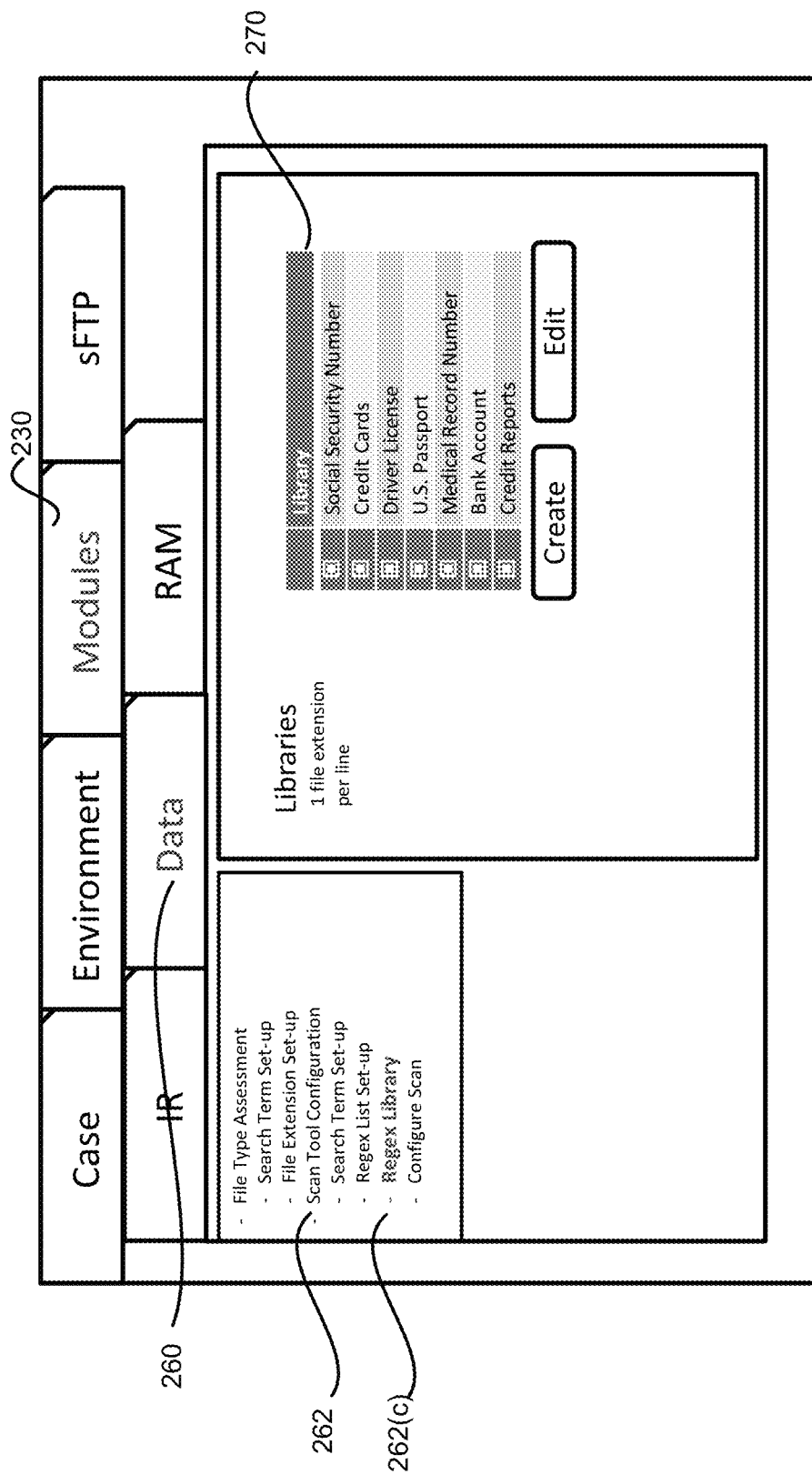

FIG. 2I shows an example graphical user interface for the sensitive data analysis module interface 260 associated with the sensitive data analysis module. FIG. 2I shows the regex library 262(c) options that are available for configuration of the sensitive data analysis module. The library window 270 shows available categories and/or libraries of sensitive data patterns that a user may select in order to configure the sensitive data analysis module to identify particular types of sensitive data. For example, depending on the type of sensitive data that the user would like to identify in the enterprise, the user can select the categories/libraries containing the terms designed to identify files containing social security numbers, credit cards, driver licenses, etc., For example, Table 1 below shows some of the sensitive data pattern categories and some corresponding sample regex sensitive data patterns associated with those categories that may be assigned to the tool when the corresponding pattern types are selected.

TABLE 1

| Pattern Type | Example Patterns | |
|---|---|---|
| Social Security | \d{3}-\d{2}-\d{4} | |
| | Social(?=Security) \| Social(?=Security) \| [Ss][Ss][Nn] | |
| Credit Card | ^(?:4[0-9]{12}(?:[0-9]{3})? | Visa |
| | ^5[1-5][0-^3[47][0-9]{13} | American Express |
| Driver's License | ^([a-zA-Z]\d{7})$ | California |
| Medical Record Number | ^([ABCEGHVabceghv]\-\d{3,8}) \| ([ABCEGHVabceghv]\d{3,8})$ | |

As explained above, the sensitive data patterns may be organized into categories. A category of sensitive data patterns may include a set of related pre-defined sensitive data patterns and/or regexs. Thus, a credit card category of sensitive data patterns may include regex scripts that identify data patterns associated with credit card numbers, expiration dates, card verification values (CVVs) or other security fields, etc. Each of the sensitive data patterns within a category are defined to search for a specific data pattern associated with the category. For example, a category of PII patterns may be defined to search for numerous different specific data patterns such as a social security numbers, dates of birth, drivers' license numbers etc. Sensitive data pattern scans may be customized by category of search such as social security number ("SSN") patterns or through set-up of a single pattern or as a list of related or unrelated patterns. Additionally, custom categories may be created and/or edited to include different sensitive data patterns specific to the enterprise (e.g., where the definitions of sensitive data vary by specific territories or industry sectors).

Figure 2J:
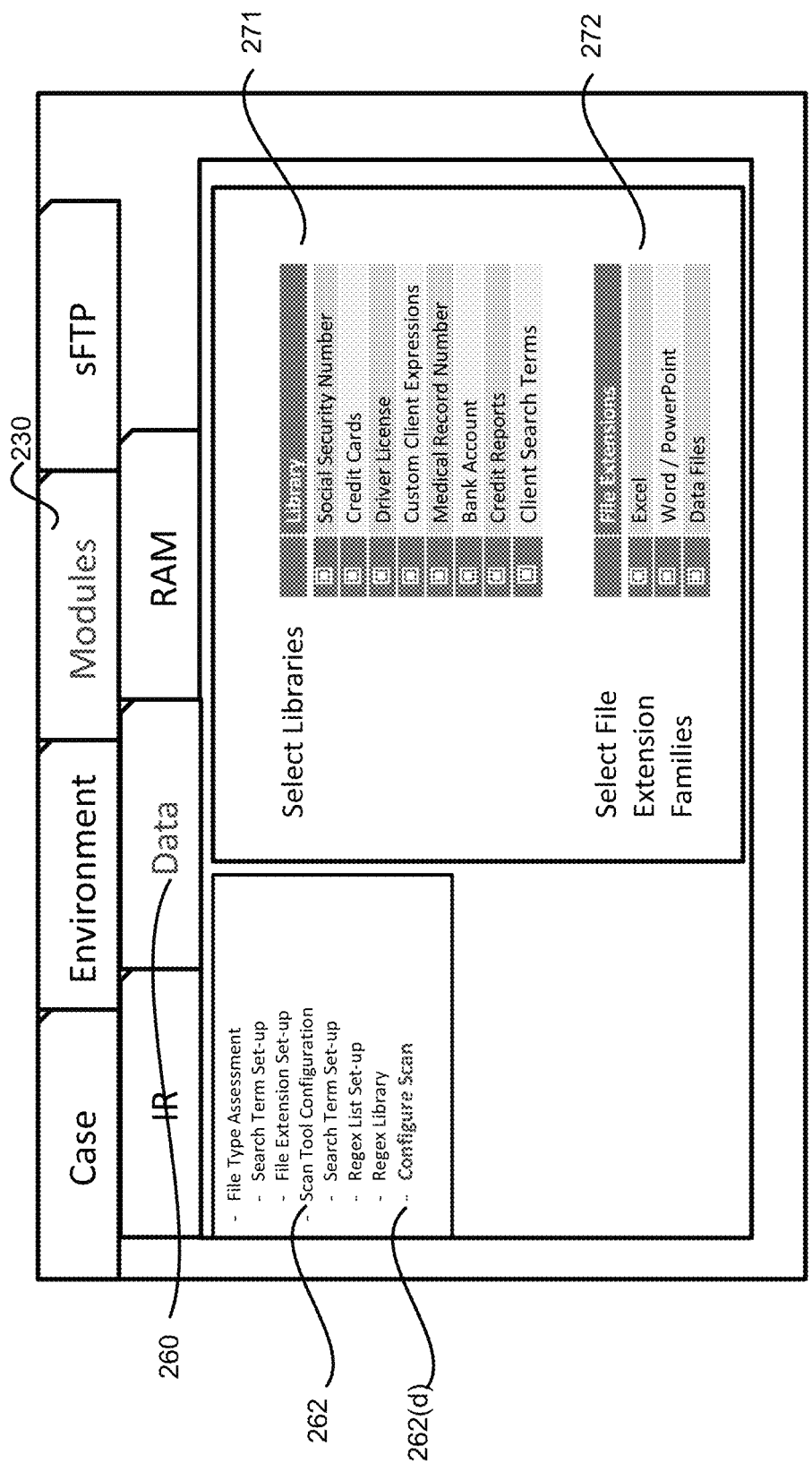

FIG. 2J shows an example graphical user interface for the sensitive data analysis module interface 260 associated with the sensitive data analysis module. FIG. 2J shows the configure scan 262(d) options that are available for configuration of the sensitive data analysis module. The configure scan 262(d) options allow a user to select the libraries 271 of sensitive data patterns and the file extension families 272 that a sensitive data analysis module may use to scan and identify sensitive data present on a computing system. The available libraries of sensitive data patterns and the available file extension families may be dependent on the configured libraries provided through the previous configuration interface options 262(*a*)-(*c*).

I. Threat Analysis Tool

Figure 3:
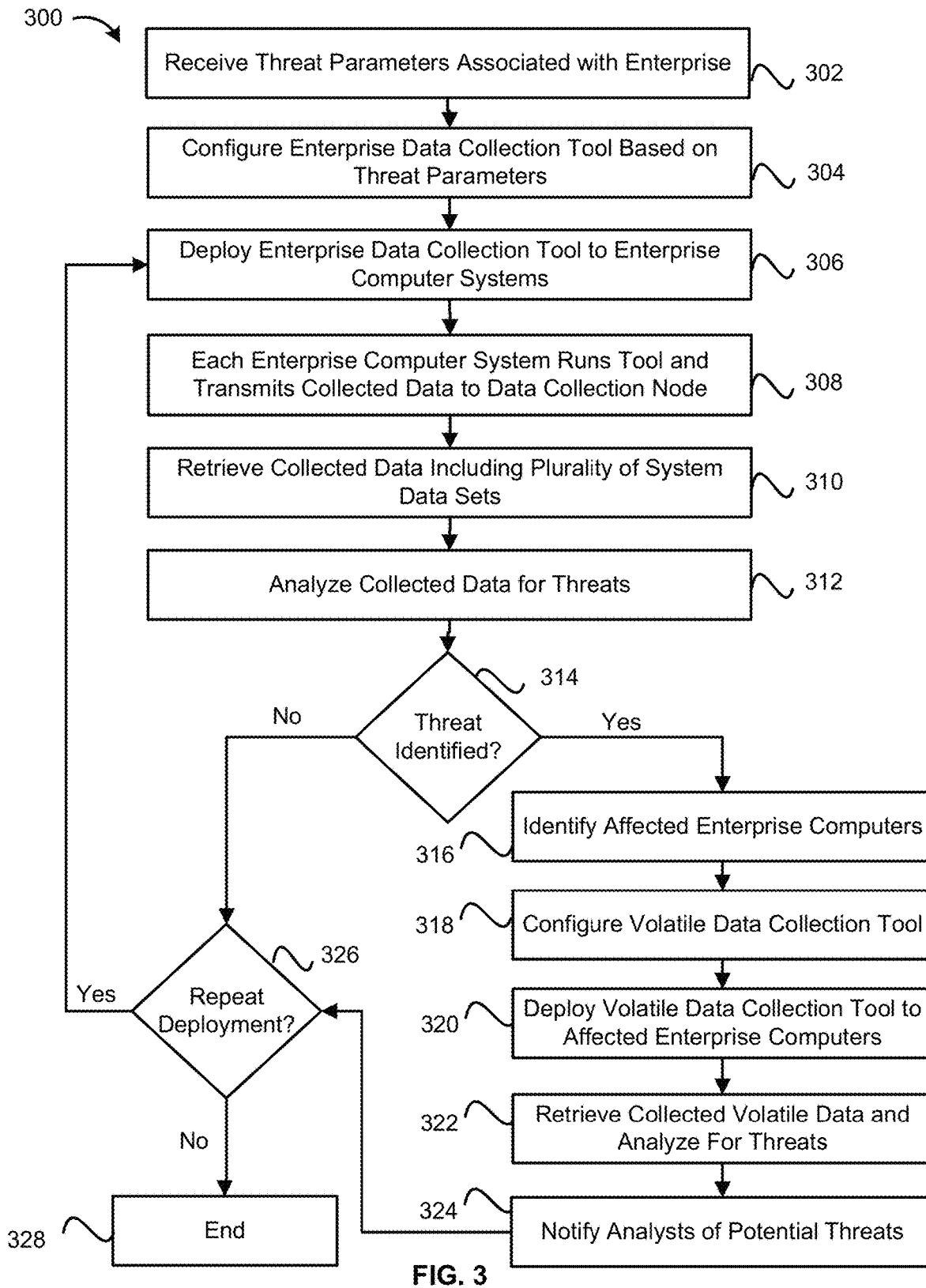
FIG. 3 illustrates an example flow diagram of a method of remotely identifying and analyzing enterprise computing systems for potential threats, in accordance with an embodiment of the present invention.

FIG. 3 illustrates an example flow diagram of a method 300 of remotely identifying and analyzing enterprise computing systems for potential threats, in accordance with an embodiment of the present invention.

At step 302, the threat analysis system receives threat parameters associated with an enterprise that is going to have the threat analysis tool deployed thereon. The threat parameters may include any configuration information that may be provided to identify the type of information to collect from the computing systems within the enterprise. For example, the threat parameters may include the configuration information that a user may provide through the configuration interfaces shown in FIGS. 2A-2E. Although this example is directed to the threat analysis tool embodiments of the present invention, in some embodiments the sensitive data analysis parameters may also be provided for tools that are configured to also perform sensitive data analysis and identification.

At step 304, the threat analysis system configures a threat analysis tool based on the received threat parameters. As described above in reference to FIG. 2D, the threat analysis tool may be configured to collect a variety of system information associated with a variety of threat parameters including code, scripts, and/or any other relevant information to allow the threat analysis tool to obtain the relevant system information from the computing systems for later analysis by threat analysis system.

At step 306, the threat analysis system deploys the threat analysis tool to the enterprise computing systems. For example, the threat analysis tool may be compiled into an executable and may be accessible through a web-based interface for download by an analyst or administrator of the enterprise. Further, the threat analysis tool may be provided through any other suitable method including direct submission to each of the computing systems identified by a user, email to an administrator for pushing to each of the relevant computing systems of the enterprise, etc.

At step 308, the threat analysis tool is executed on each of the computing systems of the enterprise. The threat analysis tool is configured to collect system information associated with the threat parameters and transmit the collected information to a specific pre-determined/configured secure storage area. For example, when the threat analysis tool is pushed to a computing system, the tool may be copied to a temporary folder on the computer. At the end of execution, the tool encrypts and uploads the collected data text files via a local SFTP server. Once the data has been successfully uploaded, the tool and any artifacts or temporary data folders created by the threat analysis tool are automatically removed from the workstation via a secure delete operation. The collected information for each computing system may be named separately with a consistent naming convention that allows the threat analysis system to identify which data set was collected on which enterprise computer, from which module, and at what time.

At step 310, the threat analysis system obtains the collected data from the secure storage area. For example, the threat analysis system may obtain a zip file of the collected data from the host. The zip file may be decrypted and decompressed, to open a new folder that contains all collected data/text files for each section of the threat analysis tool and/or module. Each of the threat parameters may have a separate file folder generated with the relevant collected information stored therein. Accordingly, all of the collected information may be analyzed and compared according to the type of system information that was collected. Further, the collected system information may be compared between different systems as well as compared against previous collected system information for a particular computing system.

At step 312, the threat analysis system analyzes the collected data for known and potential threats. The threat analysis system may perform a variety of different analyses for identifying whether known or unknown threats exist on one or more of the enterprise computing systems.

At step 314, the threat analysis system determines whether a threat is identified in one or more of the data sets of collected information. As described above in reference to the threat analysis system of FIG. 1, a number of different processes may be performed to determine whether the collected system information contains indicators of compromise, threat indicators, and/or known threats. For example, the system may analyze whether the system information includes any known threats by comparing the collected system information to a database of known threat indicators. Further, the system may remove similar system information across the collected data sets to identify the differences between the systems and analyze those differences to identify potential threats amongst the outlying system information. Moreover, system information collected over time for the system may be compared to identify any changes to the system information that may indicate a threat.

At step 316, the threat analysis system determines that a threat or a potential threat exists. Accordingly, the threat analysis system identifies the one or more computing systems of the enterprise computing systems that may be affected with one or more of the identified threats.

At step 318, the threat analysis system configures a memory threat analysis module that is configured to collect volatile and memory information from the identified computing systems associated with one or more identified potential threats.

At step 320, the threat analysis system deploys the memory analysis module to the identified and targeted computing systems. Each of the identified and targeted computing systems receives the threat analysis tool and automatically executes the threat analysis tool. The threat analysis tool collects a memory data set associated with the computing system and sends the memory data set to the secure data collection system. The memory data set may be encrypted before being sent to the secure data collection system and the memory data set may be named to identify the computing system, time, date, and/or any other relevant information to allow the threat analysis system to identify which computing system the memory data set is associated with.

At step 322, the threat analysis system retrieves the collected memory data and analyzes the memory data associated with the identified computing systems for real threats. The threat analysis may be similar to those methods described herein related to the system information. For example, the memory data may be analyzed for known threat indicators, hash signatures of the memory or a portion of the memory, and/or may be delivered to an analyst for further investigation and forensic study to identify potential threats. If any of the threats are identified from the memory information using the similar techniques described above in reference to the system information analysis, a memory threat report may be generated that includes one or more identified real threats and the corresponding relevant information automatically provided to an analyst to allow the analyst to remediate the threat.

At step 324, the threat analysis system notifies analysts of potential threats and provides the analyst with a threat report including the relevant information to allow the analyst to identify whether a real threat exists or not. Further, the analyst and/or the computing system may identify if the threat is real, and if so, the threat indicators may be added to the threat indicator database for future reference. Further, the threat indicators that originally raised the further analysis of the volatile information may be added to the threat indicator database associated with the system information as well to ensure that future matching behavior may trigger a threat indication in future analyses.

At step 326, the threat analysis system may determine whether the threat analysis tool should be deployed again once predetermined conditions are met. For example, when the threat analysis tool was configured one or more conditions may be applied to indicate if and/or when the tool should be deployed again on a repeat basis. For example, after a predetermined amount of time has elapsed (e.g., every 24 hours) or upon an event (e.g., along with system updates deliveries delivered to the enterprise computers), the tool may be re-deployed to the computing systems. Accordingly, if the tool is designed for another deployment, the method may start back over and the incident-response module based threat analysis tool may be deployed to the enterprise computing systems as described in step 306 above. The process may continue to identify any potential threats and perform the memory analysis if a potential threat is identified. Accordingly, embodiments may be able to periodically monitor thousands or more computing systems associated with an enterprise at the same time and may maintain proactive security monitoring of the enterprise.

At step 328, if the tool is not designed to be re-deployed, the process may end and the analyst may undertake any remediation of those computing systems that have been identified as having a threat.

Figure 4:
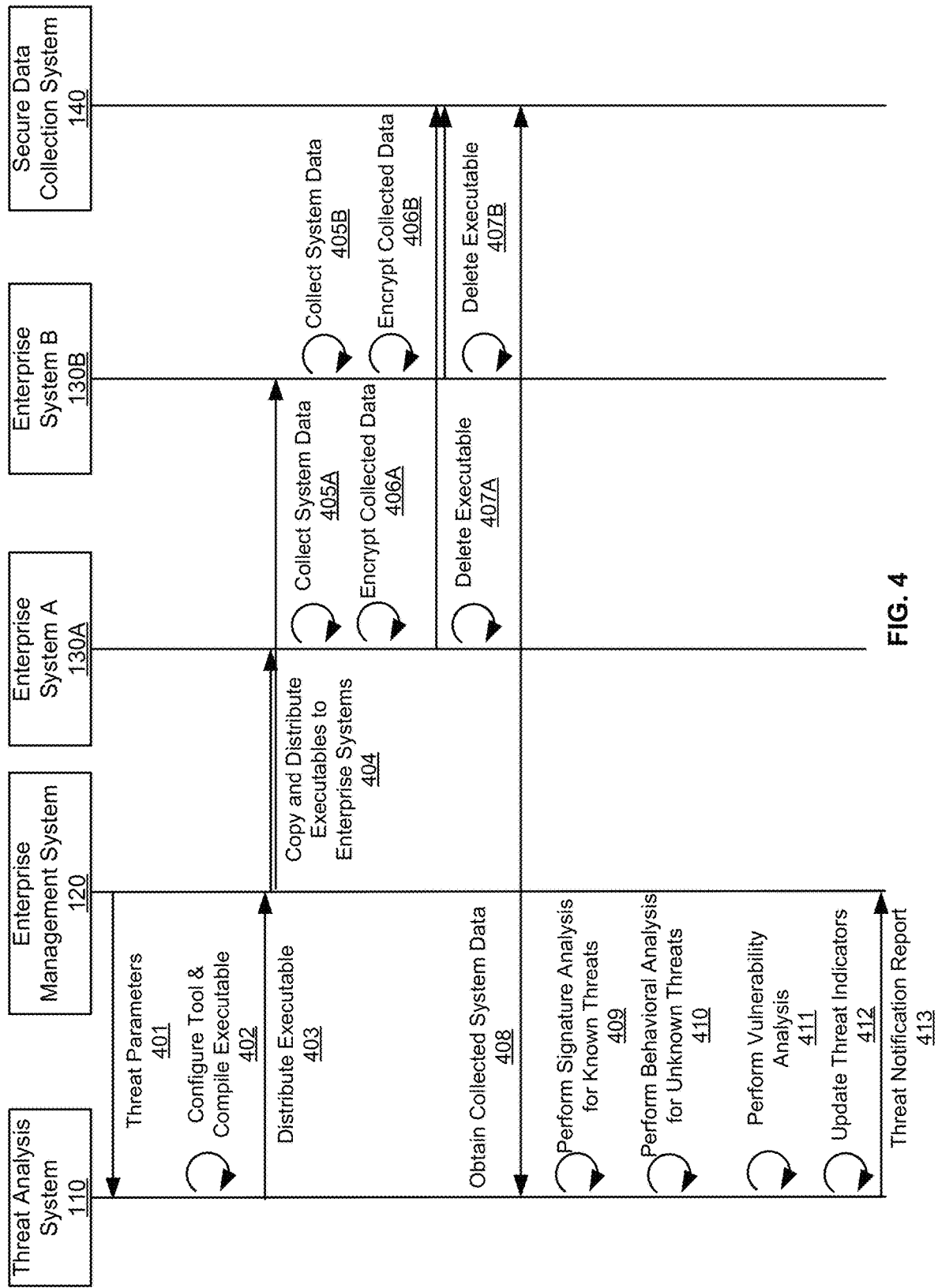
FIG. 4 illustrates an example flow diagram of a method of configuring and deploying a threat analysis tool to multiple enterprise computing systems, in accordance with an embodiment of the present invention.

FIG. 4 illustrates an example flow diagram of a method of configuring and deploying a threat analysis tool to multiple enterprise computing systems, in accordance with an embodiment of the present invention. The process flow shown in FIG. 4 may be used by the incident-response data analysis module and/or the memory analysis module to identify threats on the computing systems of the enterprise. Although the process of FIG. 4 focuses on the incident-response module of the threat analysis module, a similar mechanism may be used to deploy, collect memory and volatile information associated with the computing systems of the enterprise, and analyze the volatile and memory information using similar techniques to those shown in FIG. 4. As such, as described above in reference to FIG. 3, a second configuration and deployment process as described below may be performed for the memory analysis module of the threat analysis tool.

At step 401, an administrator of the enterprise management system may use the interface 111 to provide threat parameters to the configuration module of the threat analysis system. For example, the threat parameters may be provided through a web interface including the configuration interfaces described above in reference to FIGS. 2A-2J. The administrator may configure one or more of the data analysis modules to identify the particular types of threat parameters in which they desire the threat analysis tool to implement on the enterprise computing systems. In the example provided in FIG. 4, the threat analysis tool is configured to implement the incident-response data analysis tool in order to identify those computing systems that may have threats and which can then be further analyzed through the memory analysis module to further investigate those computing systems that indicate there may be a threat present. This provides a more efficient analysis process as the computing systems may have multiple gigabytes of memory and other volatile information stored on the computing system which may be time and computing resource intensive to obtain for all of the enterprise computing systems instead of identifying those systems that may have a problem before obtaining this information.

At step 402, the threat analysis system configures the threat analysis tool based on the threat parameters and threat parameter options identified by the system enterprise management system administrator. The configuration module may compile an executable for the tool that may be difficult to alter and/or reverse-engineer by a malicious third party that obtains and/or receives the executable of the tool.

At step 403, the threat analysis system may distribute the executable for the threat analysis tool to the enterprise management system. The enterprise management system may control the access and security features of the enterprise systems such that the easiest and most secure process for distributing the tool to the enterprise systems may be through the enterprise management system. Note that in some embodiments, the enterprise management system may provide the network addresses for the various enterprise computing systems during the configuration process such that the executable is not provided to the management system and instead is sent directly to the various computing systems of the enterprise.

At step 404, the enterprise management system may copy and distribute the executable of the threat analysis tool to the many computing systems on the enterprise that are to be analyzed. For example, the enterprise management system may make a copy of the executable of the tool for each of the computing systems that are to be analyzed and send a separate executable for the threat analysis tool to each of the computing systems. For instance, different copies of the executable are delivered to enterprise computing system A 130A and to enterprise computing system B 130B. The copies of the executable may be delivered to the various systems at the same time and may be delivered through any suitable method. For example, each executable may be pushed to each of the computing systems using the enterprise management systems administrator privileges to execute each executable on each computing system at substantially the same time. Further, the executable may be delivered, executed, and deleted without a user of the computing system knowing that anything was processed. Accordingly, the tool may execute in the background and may be hidden on the computer such that malicious software and/or users may not be aware of the presence or running of the threat analysis tool. Further, the threat analysis tool may be distributed and executed by any number of different enterprise computing systems at the same time. For instance, the same process may be performed for two computers or for 20,000 computers on the enterprise. Accordingly, the process may be leveraged to process and analyze any number of computers on an enterprise at the same or substantially the same time.

At step 405A, enterprise computing system A receives and executes the threat analysis tool executable. The tool collects a system data set from the computing system based on the threat parameters identified by the administrator of the enterprise management system. For example, the threat analysis tool may perform the functionality of the code that was provided during the configuration steps described above in reference to FIGS. 2A-2J to collect the system information associated with the various configured threat parameters. For instance, the tool may collect the netstat information by executing the code that was provided as part of the netstat code entered in reference to FIG. 2D described above. Further, network port settings, task names operating on the computer, firewall settings, and any other system configuration information of the computing system may be collected by performing the various configured processes that were selected by the threat parameters identified by the system administrator. In some embodiments, the data is collected by copying information and/or collecting actual files and logs. The threat analysis tool may also parse and collect selected raw data from files including log files and/or the Windows registry or other operating system registry.

At step 406A, the enterprise computing system may encrypt and transmit the collected system information associated with the threat parameters. For example, a shared key between the tool and the threat analysis system may be embedded in the tool to allow secure transfer of the collected data to the secure data collection system. Any other suitable security features may be built into the tool to allow the collected data to be securely delivered to the secure data selection system. Once the collected system information is encrypted, the encrypted system information may be transmitted to the identified secure data collection system. In some embodiments, the collected system information may be incorporated into a single file associated with the computing system. In other embodiments, each of the different types of system information collected by the tool may be incorporated into separate files and transmitted in batch or individually to the secure data collection system. The naming convention and location of the collected system information may be provided to the secure data collection system as described above in reference to the configuration settings described in FIGS. 2A, 2D, or through any other suitable manner. Further, in some embodiments, the enterprise computing systems may send a notification to the threat analysis system that the threat analysis is completed and that the data was successfully transmitted to the secure data collection system.

At step 407A, the enterprise computing system may delete the executable tool and any stored collected data so that it is more difficult for malicious software on the computing system to identify the presence and/or operation of the threat analysis tool. Accordingly, the tool may be present on the computing system for a limited period of time in order to collect and transmit the relevant information to a secure collection point and may be deleted as soon as that processing is accomplished. At step 405B-407B, the same processes as 405A-407A described above may be performed by enterprise computing system B 130B. Accordingly, each of the computing systems may perform the data collection and delivery to the secure data collection system at substantially the same time and the process can be accomplished by any number of the enterprise computing systems. Accordingly, the secure data collection system may store encrypted system information associated with each of the enterprise computing systems in a single collection point.

At step 408, the threat analysis system may obtain the collected system data associated with each of the enterprise computing systems from the secure data collection system. The threat analysis system may obtain the collected system information upon receiving a notification from each of the enterprise computing systems that the tool has been run on each of the systems, at a predetermined period of time after distributing the tool, or upon another condition or notification being provided to the threat analysis system. The threat analysis system may decrypt the encrypted system data once the data has been obtained.

At step 409, the threat analysis system performs a signature analysis of the collected system information in order to identify potential threats within the collected system information obtained from each of the enterprise computing systems. For example, the threat analysis system may take each file collected from the system information and apply a hash algorithm to the information for each computing system. The threat analysis system may compare each of the hashed values to a database of known threat indicators to identify whether any matches are present. For example, if a file includes malware or indicators of malware, the system may identify a match in the information associated with the malware or in the match between a file containing malware by comparing the hash signatures of known threat indicators. However, the tool does not solely rely on a hash match. For instance, if the system information includes a file that has exactly the same name and file location as a known threat, but a different hash signature, the system may identify that file for further investigation. Accordingly, the system may analyze multiple attributes along with the hash signatures to identify potential threats.

The threat analysis system may log the matching system information data sets by determining a file identifier, a computing system identifier, a type of threat indicator, and/or a threat identifier associated with the system data set and may log that information for use in the threat report.

At step 410, the threat analysis system performs a behavioral analysis of the collected system information from each of the enterprise computing system to identify unknown or potential threats present in the collected system information. The behavioral analysis processing compares the system information over time to identify if the changes between system information scans indicate that malicious or threatening software is present on the computing system. For example, the tool may be distributed to enterprise computing systems two or three times a day and the differences between system information between scans can be analyzed to see if the changes indicate a malicious threat. The behavioral analysis may compare and disregard the information that does not change between scans. Accordingly, the threat analysis system may compare the collected system data set for the collected system information to previously stored historical collected system data sets for each computing system and remove any identical system data that matches one or more of the previously stored historical system data sets. Accordingly, the remaining system information in the system data set associated with the computing system may include the changes between scans of the computing system.

Accordingly, changes to the system information may indicate that malicious software has started operating on the computing system, either having come out of a dormant state or that the computing system was infected between scans. For example, if a thousand files remain the same in the system and ten files change between scans, the system may be capable of identifying that a threat exists based on the changes and the types of files that have changed. Thus, the threat analysis system may identify anomalies in the differences between scans and may compare these anomalies to a database of known threat indicators or potential threat indicators to identify whether a further investigation is needed and/or if a known threat is present. Accordingly, the threat analysis system is collecting a large number of threat indicators that can be used to identify and further investigate computing systems that have threatening behavior or indicators that match known behavior of threats. Thus, the threat analysis system compares the operating system information and/or differences between scans of file names, hash signatures of a file, file sizes, directory paths of files changing, and any other information associated with the configuration or the files present on the computing system.

Further, in some embodiments, the various system information data sets that are obtained may be compared to remove information that is the same across the majority of those computing systems. For example, if an enterprise has a thousand computers with similar system configurations, there may be 60% to 70% of identical or very similar system information between the various computing systems. Accordingly, the similar information may be removed from the analysis as it is unlikely that malicious software infected all these computers. Thus, the threat analysis process can exclude the matching high volume data and can focus on the remaining data that does not match to identify potentially threatening behavior.

Additionally, in some embodiments, the threat analysis system may compare each system data set of the plurality of system data sets to a previously stored system data set for the computing system associated with the system data set. The threat analysis system may identify one or more differences between the previously stored system data set for at least one of the plurality of computing systems. For each of the computing systems and for each of the differences between the previously collected system information data set and the present collected system information data set, the threat analysis system may compare the difference to a database of behavioral threat indicators and identify any behavioral threat indicators matching the difference. Accordingly, the system may focus on changes between collected system information received from a computer over time to identify any potential threats. For any changes that match one or more threat indicators in the threat indicator database, the threat analysis computer may determine a file identifier, a computing system identifier, a type of threat indicator, the difference between the system data sets, and a threat identifier associated with the system data set and log that information for use in the threat report.

Furthermore, in some embodiments, a similar comparison analysis may be completed for a reference system information data set that the enterprise management system may provide as a baseline for each of their systems. Accordingly, all of the system information data sets collected by the tool may be compared to a reference system information data set and the differences may be analyzed and compared to the threat indicator database to identify any anomalies and/or potential threats within the system information data set.

At step 411, the threat analysis system may perform a vulnerability analysis on the collected system information data sets. For example, the threat analysis system may analyze the different software versions present in the system information to identify any software that is out of date, is an obsolete or dated version, does not have a particular security patch installed, and/or otherwise has a potential vulnerability that may be exploited by malicious software or a hacker. Similarly, the threat analysis system may determine a file identifier, a computing system identifier, a type of vulnerability identified, and a vulnerability identifier associated with the system data set and may log that information for use in the threat report. Accordingly, an analyst and/or a system administrator may use the logged vulnerability information to push software updates and otherwise remediate the vulnerability in response to receiving the threat notification report.

At step 412, the threat analysis system updates the threat indicator database based on any real threats that are identified. The threat analysis system may identify a real threat through any suitable manner. For example, the memory information that is collected from the computing system may indicate that a real threat exists based on the known threat indicators. Further, an alert may be sent to an analyst that may perform a forensic analysis of the system information, the identified computing system, and/or the memory information that is obtained from the identified computing system and the analyst may confirm that a real threat exists. Either way, the threat analysis system may receive confirmation that at least one of the one or more identified potential threats indicates a real threat and may update the threat indicator database to include the system information associated with the real threat. The threat indicator database may be updated by adding a hash signature associated with the confirmed threatening file or the system data set collected from the threatened computer. For example, the threat analysis system may generate a hash signature of the system data set associated with the real threat, and may update the database of known threat indicators to include the hash of the system data set associated with the real threat. Further, in some embodiments, the updating of the threat indicator database may include identifying one or more indicators of the system data associated with the at least one identified potential threat and updating a database of known threat indicators to include the one or more indicators of the system data associated with the threat.

At step 413, the threat analysis system generates a threat notification report and sends an alert including the threat notification report to the enterprise management system. The threat notification report may include the identified potential threats from one or more computing systems of the plurality of computing systems.

The system administrator and/or analyst employing the threat analysis system may use the threat notification report to identify the files that should be investigated further. For example, an analyst may obtain the file that was identified as being potentially threatening and may perform a forensic analysis on the code within the file to determine whether a real threat exists. Accordingly, the tool may notify an analyst that there is an unknown or potentially malicious file that the system may not necessarily identify as a real threat but that is providing indicators of threatening behavior, for example, morphing activity, changing attributes associated with the file (e.g., a new file path or a large amount of data associated with it when previously it had very few system resources associated with it, etc.). Accordingly, the analyst can further investigate the file and may determine that the file is malicious and may delete the file from that machine and from the other enterprise computing systems. Further, a signature of the file may be generated and added to the known threat indicator database as well as delivered to an anti-virus provider or other security services. Additionally, the indicators that led to the file being identified as a potential threat may be updated to ensure that those specific indicators (e.g., a file name, specific directory change, specific system configuration setting change, etc.) are in future determined to be malicious activity and are therefore immediately identified as a real threat by the threat analysis system without requiring additional memory data analysis.

II. Sensitive Data Analysis Module

Figure 5:
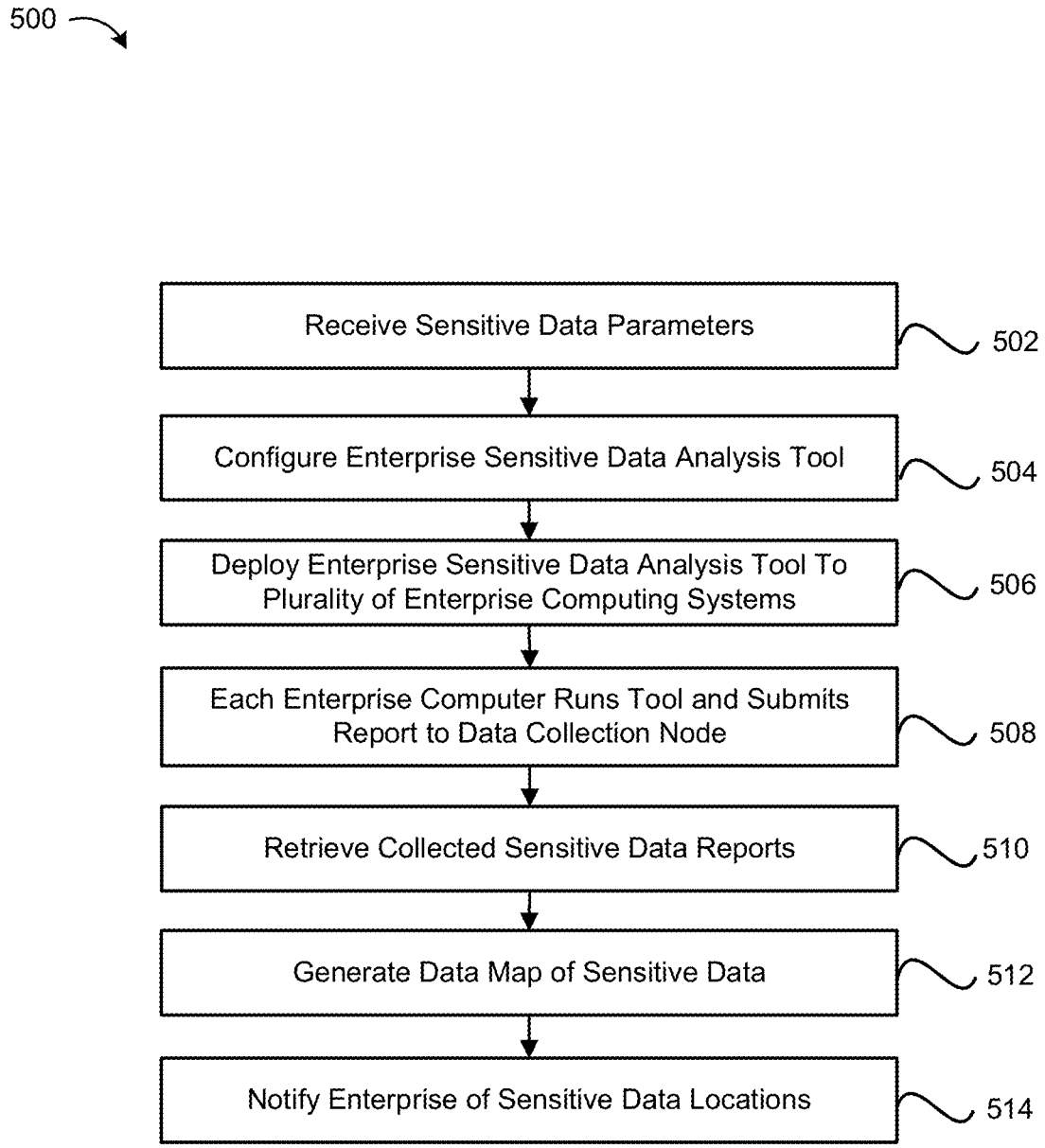
FIG. 5 illustrates an example flow diagram of a method of remotely identifying sensitive data on multiple enterprise computing systems, in accordance with an embodiment of the present invention.

FIG. 5 illustrates an example flow diagram of a method of remotely identifying sensitive data on multiple enterprise computing systems, in accordance with an embodiment of the present invention.

At step 502, the threat analysis system receives sensitive data parameters associated with an enterprise. For example, as explained above, a user may configure the sensitive data patterns and keywords that may be used to identify sensitive data on the computing systems. For example, any of the interfaces shown in FIGS. 2F-2K may be used to provide the sensitive data parameters for the configuration of the tool.

At step 504, the threat analysis system configures and compiles a sensitive data analysis module based on the received sensitive data parameters. For example, the tool may be compiled into an executable that cannot be altered or reverse-engineered such that the particular patterns and specific searching techniques may be hidden from the computing system once the executable for the tool is compiled.

At step 506, the threat analysis system distributes the tool to a plurality of computing systems in the enterprise. The threat analysis system may distribute the tool directly to each of the computing systems within the enterprise and/or may provide the tool to the enterprise management system which may push the tool to the selected computing systems.

At step 508, each of the plurality of computing systems executes the tool and analyzes the computing system for files containing sensitive data. The tool scans the computing system to identify a plurality of files associated with the computing system and analyzes each of the plurality of files to identify sensitive files including sensitive data matching at least one of the sensitive data parameters. Additionally, the tool generates a sensitive data report including file information associated with each of the sensitive files and sends the sensitive data report to a secure data storage location. For example, the reports for each computer may be recorded to a directory used by the scan tool to collect data and each report may be named to identify the computer name, a scan type indicator, and a time stamp. The computer name may be the name of the computer as identified on the network, the type of scan may identify that a sensitive data scan is being performed, and the date or time stamp may indicate the date that the scan is completed by the system and is derived by the source system where the scan tool is hosted. Each report may include user profile information and system information. The report may include a name assigned to the device, a type of operating system installed on the device, a version of the operating system installed on the computing device, a directory path where the operating system is installed on the computing device, an identification of the hard drive letters scanned, and a user profile identifier.

At step 510, the threat analysis system obtains a plurality of sensitive data reports associated with the plurality of computing systems from the secure data storage location, where each sensitive data report is associated with one of the plurality of computing systems.

At step 512, the threat analysis system analyzes the plurality of sensitive data reports and generates a sensitive data map for the enterprise. The sensitive data map may identify each of the plurality of computing systems in the enterprise and the file information associated with each of the plurality of computing systems.

At step 514, the threat analysis system notifies the enterprise of the sensitive data locations within the enterprise that contain sensitive data. For example, an alert including the generated sensitive data map may be provided to an enterprise management system.

Figure 6:
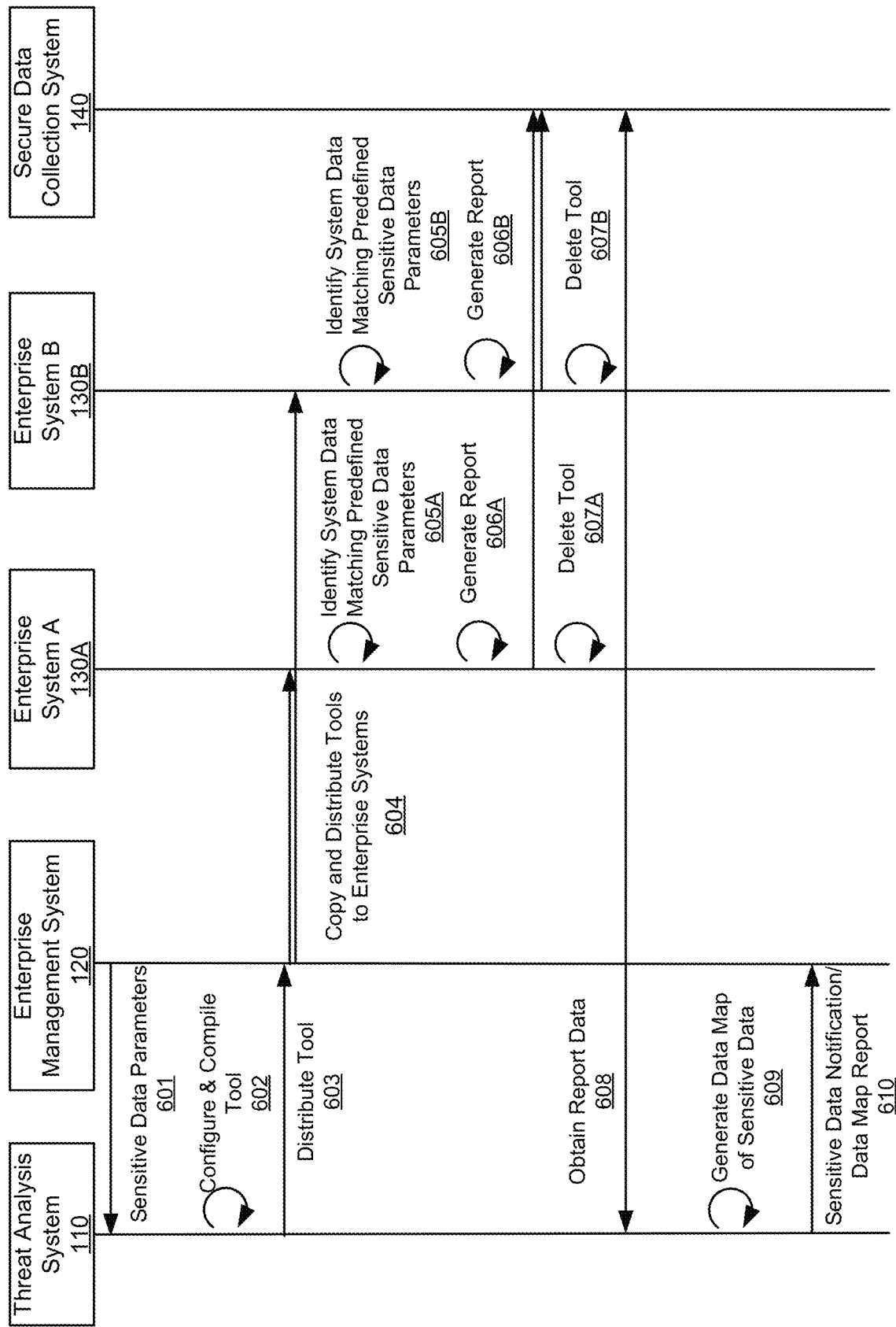
FIG. 6 illustrates an example flow diagram of a method of configuring and deploying a sensitive data analysis module to multiple enterprise computing systems, in accordance with an embodiment of the present invention.

FIG. 6 illustrates an example flow diagram of a method of configuring and deploying a sensitive data analysis module to multiple enterprise computing systems, in accordance with an embodiment of the present invention.

At step 601, the threat analysis system receives sensitive data parameters associated with an enterprise. For example, the sensitive data parameters may include a plurality of sensitive data patterns and/or a plurality of sensitive keywords.

At step 602, the threat analysis system configures and compiles a sensitive data analysis module based on the received sensitive data parameters.

At step 603, the threat analysis system distributes the tool to a plurality of computing systems in the enterprise. The threat analysis system may be a Collection Tool/Scanning agent that is pushed out to multiple machines to collect and scan data from each system.

At step 604, the enterprise management system copies and distributes the tool to a plurality of computing systems in the enterprise. For example, the enterprise management system may send copies of the sensitive data analysis module to enterprise system A and enterprise system B. The enterprise management system may be implemented as a dashboard portal or application that performs the following functions:

1. Select the environment, IR, or PII analysis
2. Configure and/or compile
3. Determine deployment methodology and deployment recurrence
4. Collect data and perform a threat detection scan
5. Perform an automated and manual backend analysis against a database of identified threats
6. Update the database of identified threats
7. Repeat the threat detection scan The tool deployed by the Threat Analysis System can be copied to multiple systems via a systems administrator. The enterprise management system (i.e., portal) can be setup in a client environment to control and deployed to multiple systems, providing a more automated endpoint threat detection solution.

At step 605A, enterprise system A receives the sensitive data analysis module and executes the tool. The tool identifies system data matching predefined sensitive data parameters to identify files containing sensitive data. The tool scans the computing system to identify a plurality of files associated with the computing system and analyzes each of the plurality of files to identify sensitive files including sensitive data matching at least one of the sensitive data parameters. For example, the tool may parse each of the plurality of files to identify a plurality of expressions within each of the plurality of files, compare each of the plurality of expressions to each of the plurality of sensitive data patterns, and identify any matching expressions based on at least one of the sensitive data patterns. Further, the tool may parse each of the plurality of files to identify a plurality of expressions within each of the plurality of files as well as the titles of the files, compare each of the plurality of expressions to each of the plurality of keywords, and identify any matching expressions based on at least one of the plurality of keywords.

Additional processing of the files on the computing device may be performed as well. For example, the files on the system may be segregated into image-based files and text-searchable files. Due to their internal file structure, text that may be viewable in an image-based file is typically not immediately searchable without the use of an optical character recognition ("OCR") application to extract the text in an image based file. Accordingly, the tool may segment image-based files for separate analysis, while text-based files may be compared to the sensitive data patterns and search terms. The sensitive data patterns and search terms may be customized for each configured tool. For example, hospital data may be customized for CPT and ICD codes. Rather than attempt actual scanning/searching of the image-based files (by the OCR process referenced below, the relevance of the image-based files may be determined using file-type segmentation as well as metadata (e.g., security requirements, authorship, permissions, etc.) analysis of the source data being analyzed. This type of analysis may include heuristic analysis and statistical sampling. In some embodiments, specific files and directories of files may be identified for manual review. Image-based files may also be pre-processed using OCR techniques to alter the image files into text-searchable files, depending on the file type, image quality, whether the image-based file is encrypted, etc.

Further, in some embodiments, the tool may assign a unique identifier to each of the sensitive files and transfer each of the sensitive files to a second data store within the enterprise. The second data store may store each of the sensitive files along with the corresponding unique identifier to allow for a central repository of sensitive information. Accordingly, the sensitive information may be removed from the computer systems. However, the sensitive information may still be stored in the second data store and will be accessible for future analysis through a link to the sensitive information based on the assigned unique identifier provided to each of the computing systems. According to various embodiments, the threat analysis tool may delete files flagged as sensitive. Alternatively in other embodiments the threat analysis tool can reference sensitive files in a report allowing the organization to manually delete the files, or automatically batch delete them.

At step 606A, the tool generates a sensitive data report including file information associated with each of the identified sensitive files and sends the sensitive data report to a secure data storage location. The sensitive data report may include a file identifier, a file location, a file type, a computing system identifier, a file size, a type of sensitive data indicator, the matched sensitive data pattern, and at least one matching expression for each of the identified sensitive files matching the sensitive data patterns and/or sensitive keywords. For example, for each file scanned, a pattern match to a regular expression may be identified and extracted to a text file report. Further, one file may have one or more pattern matches to a regular expression data pattern where each pattern match to a regular expression data pattern is extracted and documented separately. For each pattern match, the line of text where the match was identified and a predetermined number of lines of text before and after the match will be extracted for a report (e.g., 3 total lines of text may be extracted). Thus, in some embodiments, the report may include the matched pattern, the extracted text surrounding the pattern match, the file name and corresponding file extension, and a directory path for each matching expression to a sensitive data pattern. Further, in some embodiments, in order to manage file sizes, pattern matches may be recorded in separately segmented files or in a database format. In some embodiments, if there are no files with matches, then a message identifying no matches (e.g., "No matching records were found.") may be placed inside the report.

At step 607A, the computing system deletes the tool and any related artifacts created by the tool. In some embodiments, the deletion of related artifacts, such as sensitive data, may be manually reviewed and deleted by an analyst or system administrator. In parallel, enterprise system B may also perform steps 605B-607B such that all of the enterprise computing systems that received and executed the sensitive data collection tool may perform the sensitive data analysis process substantially in parallel. Accordingly, the process can be leveraged across all of the enterprise computing systems at substantially the same time without causing delay in the analysis of sensitive data on each of the respective computing systems.

At step 608, the threat analysis system may obtain the plurality of report data stored at the secure data collection system for the plurality of enterprise computing systems.

At step 609, the threat analysis system generates a data map of the plurality of sensitive data across the plurality of enterprise computing systems present in the enterprise.

At step 610, the threat analysis system generates an alert including the sensitive data map and sends the alert to the enterprise management system.

Figure 7:
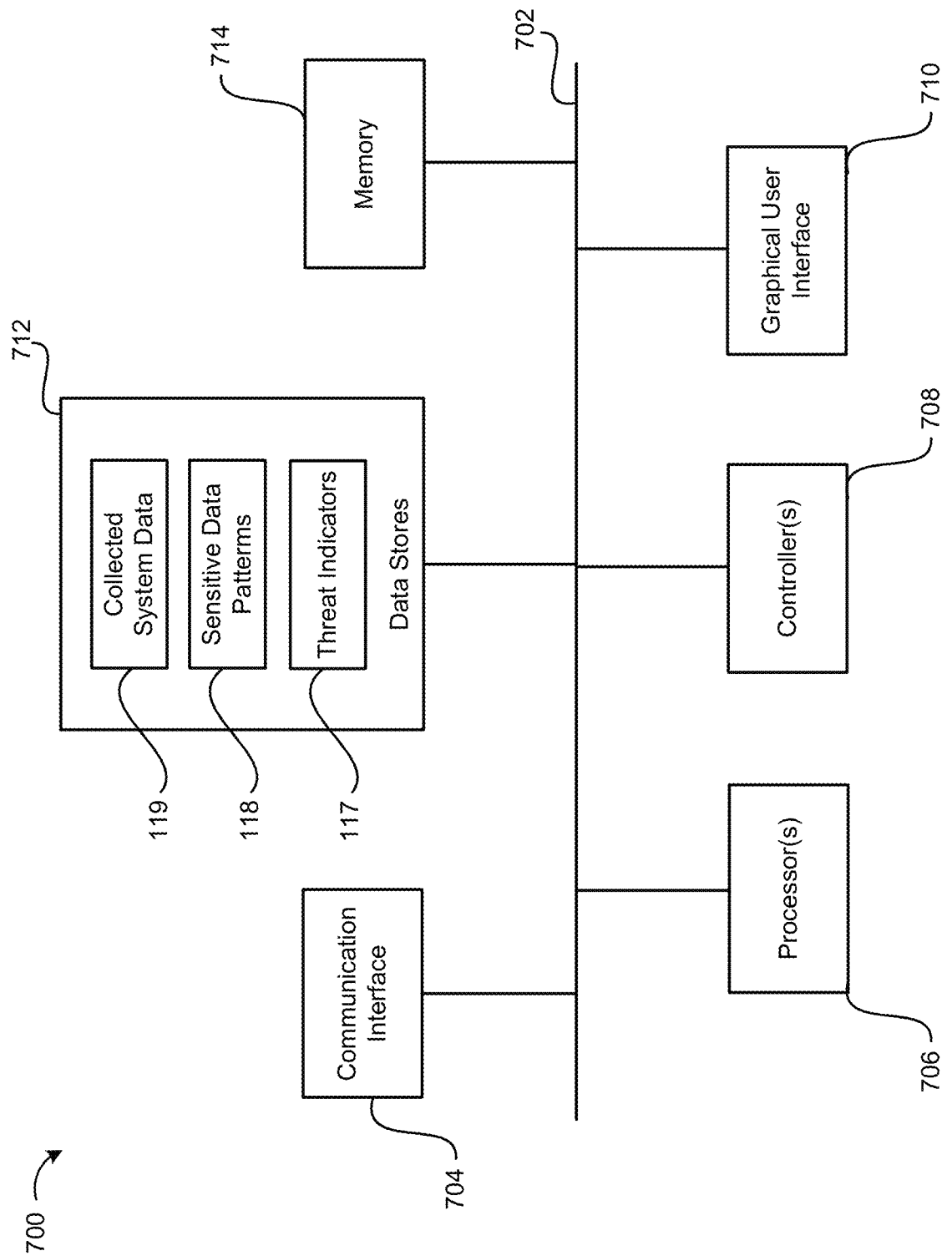
FIG. 7 illustrates a high level block diagram of a computer system, in accordance with an embodiment of the present invention.

FIG. 7 illustrates a high-level block diagram 700 of a computer system, in accordance with an embodiment of the present invention. As shown in FIG. 7, a computer system can include hardware elements connected via a bus 702, including a communication interface 704 (e.g., network interface), that enables the computer system to connect to other computer systems over a local area network (LAN), wide area network (WAN), mobile network (e.g., EDGE, 3G, 4G, or other mobile network), or other network. Communication interface 704 can further include a wired or wireless interface for connecting to infrared, Bluetooth, or other wireless devices, such as other platforms or pods. The computer system can further include one or more processors 706, such as a central processing unit (CPU), field programmable gate array (FPGA), application-specific integrated circuit (ASIC), network processor, or other processor. Processers may include single or multi-core processors.

In some embodiments, one or more controllers 708 can be used to control the operation of the computer system, the controllers may include hardware and software controllers. In some embodiments, the computer system can include a graphical user interface (GUI) 710. GUI 710 can connect to a display (LED, LCD, tablet, touch screen, or other display) to output user viewable data. In some embodiments, GUI 710 can be configured to receive instructions (e.g., through a touch screen or other interactive interface).

In some embodiments, the computer system may include local or remote data stores 712. Data stores 712 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 712 can include data generated, stored, or otherwise utilized as described herein. For example, data stores 712 can include all or portions of collected system data 119, sensitive data patterns 118, threat indicators 117, stored as described above. Memory 714 can include various memory technologies, including RAM, ROM, EEPROM, flash memory or other memory technology. Memory 714 can include executable code to implement methods as described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for sensitive data analysis, the method comprising:
   receiving sensitive data parameters associated with an enterprise;
   configuring a tool based on the sensitive data parameters;
   distributing the tool to a plurality of computing systems in the enterprise, wherein at each computing system the tool is executed for:
      scanning, in a stealth mode in a background of the computing system, the computing system to identify a plurality of files associated with the computing system,
      analyzing each of the plurality of files to identify sensitive files including sensitive data matching at least one of the sensitive data parameters,
      assigning an identifier to each of the sensitive files,
      transferring each of the sensitive files to a data store that stores each of the sensitive files along with the corresponding identifier,
      deleting each of the identified sensitive files from the computing system,
      generating a sensitive data report including file information associated with each of the identified sensitive files,
      sending the sensitive data report to the data store; and
      deleting the tool from the computing system after the sensitive data report is sent to the data store;
   obtaining a plurality of sensitive data reports associated with the plurality of computing systems from the data store, each sensitive data report associated with one of the plurality of computing systems;
   generating a sensitive data map for the enterprise, the sensitive data map identifying each of the plurality of computing systems in the enterprise and the file information associated with each of the plurality of computing systems; and
   causing an alert including the sensitive data map to be provided to an enterprise management system.

2. The method of claim 1, wherein the sensitive data parameters include a plurality of sensitive data patterns, and wherein analyzing each of the plurality of files to identify sensitive files including sensitive data matching at least one of the sensitive data parameters further comprises:
   parsing each of the plurality of files to identify a plurality of expressions within each of the plurality of files;
   comparing each of the plurality of expressions to each of the plurality of sensitive data patterns; and
   identifying at least one matching expression based on at least one of the sensitive data patterns.

3. The method of claim 1, wherein the sensitive data parameters include a plurality of sensitive keywords, and wherein analyzing each of the plurality of files to identify sensitive files including sensitive data matching at least one of the sensitive data parameters further comprises:

parsing each of the plurality of files to identify a plurality of expressions within each of the plurality of files;

comparing each of the plurality of expressions to each of the plurality of keywords; and identifying at least one matching expression based on at least one of the plurality of keywords.

4. The method of claim 1, wherein the sensitive data report includes a file identifier, a file location, a file type, a computing system identifier, a file size, a type of sensitive data indicator, and the at least one matching expression for each of the sensitive files.

5. The method of claim 1, wherein the tool is replicated by an enterprise management system and distributed to the plurality of computing systems within the enterprise.

6. The method of claim 1, wherein the stealth mode executes the application in the background to hide the execution of the tool.

7. The method of claim 1, wherein the computing system deletes the tool from the computing system after being executed by the computing system by performing a secure delete operation that removes the tool and data generated by the tool during execution of the tool from the computing system.

8. The method of claim 1, wherein the data store comprises a first data store and a second data store, the sensitive files are transmitted to the first data store and the sensitive data report is transmitted to the second data store, and the first data store and the second data store are different.

9. A computing device for sensitive data analysis, the computing device comprising:
   a processor; and
   a computer-readable medium comprising code, executable by the processor, to perform a method comprising:
      receive sensitive data parameters associated with an enterprise;
      configure a tool based on the sensitive data parameters;
      distribute the tool to a plurality of computing systems in the enterprise, wherein at each computing system the tool is executed for:
         scanning, in a stealth mode in a background of the computing system, the computing system to identify a plurality of files associated with the computing system,
         analyzing each of the plurality of files to identify sensitive files including sensitive data matching at least one of the sensitive data parameters,
         assigning an identifier to each of the sensitive files,
         transferring each of the sensitive files to a data store that stores each of the sensitive files along with the corresponding identifier,
         deleting each of the identified sensitive files from the computing system,
         generating a sensitive data report including file information associated with each of the identified sensitive files,
         sending the sensitive data report to the data store; and
         deleting the tool from the computing system after the sensitive data report is sent to the data store;
      obtain a plurality of sensitive data reports associated with the plurality of computing systems from the data store, each sensitive data report associated with one of the plurality of computing systems;
      generate a sensitive data map for the enterprise, the sensitive data map identifying each of the plurality of computing systems in the enterprise and the file information associated with each of the plurality of computing systems; and
      cause an alert including the sensitive data map to be provided to an enterprise management system.

10. The computing device of claim 9, wherein the sensitive data parameters include a plurality of sensitive data patterns, and wherein analyzing each of the plurality of files to identify sensitive files including sensitive data matching at least one of the sensitive data parameters further comprises:
   parsing each of the plurality of files to identify a plurality of expressions within each of the plurality of files;
   comparing each of the plurality of expressions to each of the plurality of sensitive data patterns; and
   identifying at least one matching expression based on at least one of the sensitive data patterns.

11. The computing device of claim 9, wherein the sensitive data parameters include a plurality of sensitive keywords, and wherein analyzing each of the plurality of files to identify sensitive files including sensitive data matching at least one of the sensitive data parameters further comprises:
   parsing each of the plurality of files to identify a plurality of expressions within each of the plurality of files;
   comparing each of the plurality of expressions to each of the plurality of keywords; and
   identifying at least one matching expression based on at least one of the plurality of keywords.

12. The computing device of claim 9, wherein the sensitive data report includes a file identifier, a file location, a file type, a computing system identifier, a file size, a type of sensitive data indicator, and the at least one matching expression for each of the sensitive files.

13. The computing device of claim 9, wherein the tool is replicated by an enterprise management system and distributed to the plurality of computing systems within the enterprise.

14. The computing device of claim 9, wherein the stealth mode executes the application in the background to hide the execution of the tool.

15. The computing device of claim 9, wherein the computing system deletes the tool from the computing system after being executed by the computing system by performing a secure delete operation that removes the tool and data generated by the tool during execution of the tool from the computing system.

16. The computing device of claim 9, wherein the data store comprises a first data store and a second data store, the sensitive files are transmitted to the first data store and the sensitive data report is transmitted to the second data store, and the first data store and the second data store are different.

17. A non-transitory computer readable storage medium, which when executed by a processing system of a computing device, causes the computing device to perform operations for sensitive data analysis, the operations comprising:
   receiving sensitive data parameters associated with an enterprise;
   configuring a tool based on the sensitive data parameters;
   distributing the tool to a plurality of computing systems in the enterprise, wherein at each computing system the tool is executed for:
      scanning, in a stealth mode in a background of the computing system, the computing system to identify a plurality of files associated with the computing system;

analyzing each of the plurality of files to identify sensitive files including sensitive data matching at least one of the sensitive data parameters;

assigning an identifier to each of the sensitive files;

transferring each of the sensitive files to a data store that stores each of the sensitive files along with the corresponding identifier;

deleting each of the identified sensitive files from the computing system;

generating a sensitive data report including file information associated with each of the identified sensitive files;

sending the sensitive data report to the data store; and deleting the tool from the computing system after the sensitive data report is sent to the data store;

obtaining a plurality of sensitive data reports associated with the plurality of computing systems from the data store, each sensitive data report associated with one of the plurality of computing systems;

generating a sensitive data map for the enterprise, the sensitive data map identifying each of the plurality of computing systems in the enterprise and the file information associated with each of the plurality of computing systems; and causing an alert including the sensitive data map to be provided to an enterprise management system.

18. The non-transitory computer readable storage medium of claim 17, wherein the sensitive data parameters include a plurality of sensitive data patterns, and wherein analyzing each of the plurality of files to identify sensitive files including sensitive data matching at least one of the sensitive data parameters further comprises operations for:

parsing each of the plurality of files to identify a plurality of expressions within each of the plurality of files;

comparing each of the plurality of expressions to each of the plurality of sensitive data patterns; and identifying at least one matching expression based on at least one of the sensitive data patterns.

19. The non-transitory computer readable storage medium of claim 17, wherein the sensitive data parameters include a plurality of sensitive keywords, and wherein analyzing each of the plurality of files to identify sensitive files including sensitive data matching at least one of the sensitive data parameters further comprises operations for:

parsing each of the plurality of files to identify a plurality of expressions within each of the plurality of files;

comparing each of the plurality of expressions to each of the plurality of keywords; and identifying at least one matching expression based on at least one of the plurality of keywords.

20. The non-transitory computer readable storage medium of claim 17, wherein the sensitive data report includes a file identifier, a file location, a file type, a computing system identifier, a file size, a type of sensitive data indicator, and the at least one matching expression for each of the sensitive files.

* * * * *